(12) United States Patent
Toda

(10) Patent No.: US 6,330,627 B1
(45) Date of Patent: Dec. 11, 2001

(54) SYSTEM FOR FAST DATA TRANSFER BETWEEN MEMORY MODULES AND CONTROLLER USING TWO CLOCK LINES EACH HAVING A GO LINE PORTION AND A RETURN LINE PORTION

(75) Inventor: Haruki Toda, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/232,854

(22) Filed: Jan. 19, 1999

(30) Foreign Application Priority Data

Jan. 20, 1998 (JP) .................................................. 10-008279

(51) Int. Cl.[7] .............................. G06F 13/16; G06F 1/12; G06F 1/10; G06F 1/00; H04B 14/06
(52) U.S. Cl. ........................ 710/104; 710/126; 710/107; 710/61; 710/60; 710/58; 710/29; 713/503; 711/167; 375/348; 375/356; 365/52; 365/233; 327/149; 327/161
(58) Field of Search .................................. 710/1, 25, 29, 710/58, 61, 104, 107, 127, 60; 713/503; 711/167; 327/149, 161; 375/348, 356; 365/52, 233

(56) References Cited

U.S. PATENT DOCUMENTS

| 5,432,823 | * | 7/1995 | Gasbarro et al. | 375/356 |
| 5,721,890 | * | 2/1998 | Langendorf | 713/503 |
| 5,987,576 | * | 11/1999 | Johnson et al. | 711/167 |
| 6,034,878 | * | 3/2000 | Osaka et al. | 365/52 |
| 6,069,508 | * | 5/2000 | Takai | 327/161 |
| 6,100,733 | * | 8/2000 | Dortu et al. | 327/149 |
| 6,115,318 | * | 9/2000 | Keeth | 365/233 |
| 6,134,638 | * | 10/2000 | Olarig et al. | 711/167 |
| 6,157,688 | * | 12/2000 | Tamura et al. | 375/348 |

FOREIGN PATENT DOCUMENTS

| 09161472A | * | 6/1997 | (JP) | G06F/1/06 |
| 10187592A | * | 7/1998 | (JP) | G06F/1/10 |
| 10304240A | * | 11/1998 | (JP) | H04N/5/232 |

OTHER PUBLICATIONS

Jae–Yoon Sim et al., "1 Gb/s Current–Mode Bidirectional I/O buffer" 1997 Symposium on VLSI Circuits Digest of Technical Papers, IEEE CHAT No. 97, CH 36115, PP. 121–122.

* cited by examiner

*Primary Examiner*—Thomas Lee
*Assistant Examiner*—Katharina Schuster
(74) *Attorney, Agent, or Firm*—Banner & Witcoff, Ltd.

(57) ABSTRACT

Memory modules and a controller are arranged and two clock lines are provided to go and return along the arrangement of the memory modules and the controller. A first basic clock and a second basic clock having twice the cycle period of the first basic clock are transferred over the go portions of the respective clock lines to the memory modules and the controller. After passing through the turnaround point, the first and second basic clocks are transferred as return clocks over the return portions of the clock lines to the memory modules and the controller. The first and second basic go clocks and the first and second basic return clocks are fed into the memory modules and the controller. The input/output operation of data is controlled synchronously with these clocks.

23 Claims, 23 Drawing Sheets

SYSTEM FOR FAST DATA TRANSFER BETWEEN MEMORY MODULES AND CONTROLLER USING TWO CLOCK LINES EACH HAVING A GO LINE PORTION AND A RETURN LINE PORTION

BACKGROUND OF THE INVENTION

The present invention relates to a data transfer system which has multiple memory modules and a controller for controlling data read and write operations of the memory modules and provides synchronous data transfer between each memory module and the controller. Further, the present invention specifically relates to a technique of improving significantly efficiency in data transfers by transferring both read data and write data over the same bus.

As the performance of microprocessor units (MPUs) used in control systems has improved, the capacity of IC memories used has increased to 256 megabits, 1 gigabits. Under such a circumstance, how to transfer large amounts of data efficiently has become increasingly important.

In U.S. Pat. No. 5,432,823, there is disclosed a data transfer system which realizes fast data transfer.

FIG. 1 is a schematic representation of the data transfer system disclosed in that U.S. Patent. This system is provided with a clock generator (CG) 301, a plurality of memory modules 302, and a controller 303. The memory modules 302 and the controller 303 are arranged in parallel. A clock interconnect line 304 is provided to go and return along the arrangement of the memory modules and the controller. Further, a data bus 305 is provided along the arrangement of the memory modules and the controller.

Clock pulses, generated by the clock generator 301, are transferred as clock TCLK to the memory modules 302 and the controller 303 in sequence over the go portion of the clock line 304. After passing through the turnaround point from the go portion to the return portion, the clock pulses are transferred as clock RCLK in the direction opposite to the direction in which they are transferred over the go portion to the controller 303 and the memory modules 302 in sequence. Eventually, the clock pulses are transferred to a location near the clock generator 301. In this case, the controller 303 is located near the turnaround point of the clock line 304.

Data transfer between each of the memory modules 302 and the controller 303 is made via the data bus 305.

In general, in data transfer between each of the memory modules at different locations and the controller under clock-synchronized control, data collisions will occur on the data bus unless propagation delays of clock pulses are taken into consideration in advance.

The conventional system of FIG. 1 monitors the clock TCLK and the clock RCLK in the controller 303 and each of the memory modules 302 to take the following measures for avoidance of data collisions on the data bus.

That is, as shown in a timing chart of FIG. 2, in the neighborhood of the turnaround point of the clock line 304, the clock TCLK and the clock RCLK are in phase with each other, whereas, in the neighborhood of the clock generator 301, they are out of phase with each other, i.e., the clock RCLK is delayed with respect to the clock TCLK. The timing A in the middle between the clock TCLK and the clock RCLK does not depend on the location on the clock line 304 and, at any location, is midway between the clocks. If, therefore, each memory module and the controller make data transfers taking into consideration the intermediate timing A and the phase difference between the clocks TCLK and RCLK, then data collisions on the data bus 305 can be avoided.

However, when clock pulses of shorter periods (higher frequencies) are used to increase further efficiency in data transfers or the data bus is made longer as a result of connecting more memory modules so as to increase the system memory capacity, the clock propagation delay may exceed one cycle period of clock pulses.

In this case, as shown in a timing chart of FIG. 3, the erroneous timing A is obtained instead of the timing B which is originally required and corresponds to the middle of the time interval between the clocks TCLK and RCLK. For example, assume that, when the controller 303 is located in the neighborhood of the clock generator 301, the clock TCLK is transferred over the clock line 304 and delayed by more than one clock cycle period, and a positive-going edge of the return clock RCLK corresponding to a positive-going edge of the go clock TCLK at time t1 occurs at time t3. Then, when the intermediate timing is simply taken between positive-going edges of the clocks TCLK and RCLK, the intermediate timing A will be erroneously taken between the time t1 and the time that the clock RCLK rises immediately after t1. The correct intermediate timing B in this case is the time t2 between t1 and t3.

Thus, the relationship between the clocks TCLK and RCLK alone cannot decide whether or not a phase displacement of more than one clock cycle period has occurred between the clocks TCLK and RCLK, so that erroneous intermediate timing results.

The data bus is employed for transfer of both read data and write data from and to the memory modules. However, since data items "1" and "0" in data are generally represented by voltage levels, it is required to divide definitely the read data transfer timing and the write data transfer timing. For this reason, in order to make read data and write data transfers concurrently and sharply increase the data transfer efficiency approximately twofold, it is required to divide the data bus into a read data bus 306 and a write data bus 307 as shown in FIG. 4.

However, this approach doubles the number of data bus wirings, resulting in a twofold increase in the number of pins of each of the memory modules and the controller and hence increases in area and cost.

BRIEF SUMMARY OF THE INVENTION

It is therefore an object of the present invention to provide a fast data transfer system which permits data transfers to be made at high speed without increasing the number of data buses.

According to the present invention there is provided a fast data transfer system comprising: a plurality of memory modules; a controller located adjacent to the memory modules in a direction where the memory modules are arranged and communicating data with each of the memory modules; a clock generator for generating a first basic clock and a second basic clock having a cycle period n (n is either 2 or 4) times longer than a cycle period of the first basic clock; two clock lines each having a go line portion and a return line portion, which extend in opposite directions along the arrangement of the memory modules and the controller, the first and second basic clocks generated by the clock generator being respectively inputted to the two clock lines at ends of their respective go line portions and transferred over the two clock lines, and the first and second basic clocks transferred over the go and return line portions of the respective first and second clock lines being inputted to each of the memory modules and the controller, data input/output operations of each of the memory modules and the controller being performed in synchronism with the first and second basic clocks; and control circuits provided in each of the memory modules and the controller and including a timing signal generating circuit responsive to first and second basic go clocks transferred over the go line portions of the clock lines and first and second basic return clocks transferred over the return line portions of the clock lines for generating a intermediate timing signal having a timing which positioned in the middle of a phase displacement that occurs between the first basic go clock and the first basic return clock within a period n (n is either 2 or 4) times the cycle period of the first basic clock In addition, according to the present invention there is provided a fast data transfer system comprising: a plurality of memory modules; a controller for communicating data with each of the memory modules; and a data bus connecting the memory modules and the controller, wherein each of the memory modules and the controller having a data input/output circuit for allowing the value of and the direction of a current that flows through the data bus to vary with data to be transferred.

Additional objects and advantages of the invention will be set forth in the description which follows, and in part will be obvious from the description, or may be learned by practice of the invention. The objects and advantages of the invention may be realized and obtained by means of the in strumentalities and combinations particularly pointed out hereinafter.

BRIEF DESCRIPTION OF THE SEVERAL VIEWS OF THE DRAWING

The accompanying drawings, which are incorporated in and constitute a part of th e specification, illustrate presently preferred embodiments of the invention, and together with the general description given above and the detailed description of the preferred embodiments given below, serve to explain the principles of the invention.

DETAILED DESCRIPTION OF THE INVENTION

Figure 5A:
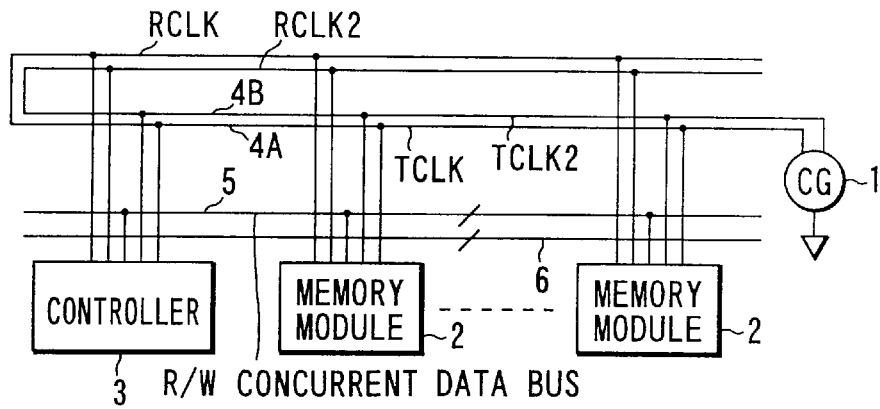
FIGS. 5A and 5B are schematic representations of a first embodiment of a fast data transfer system of the present invention.
Figure 5B:
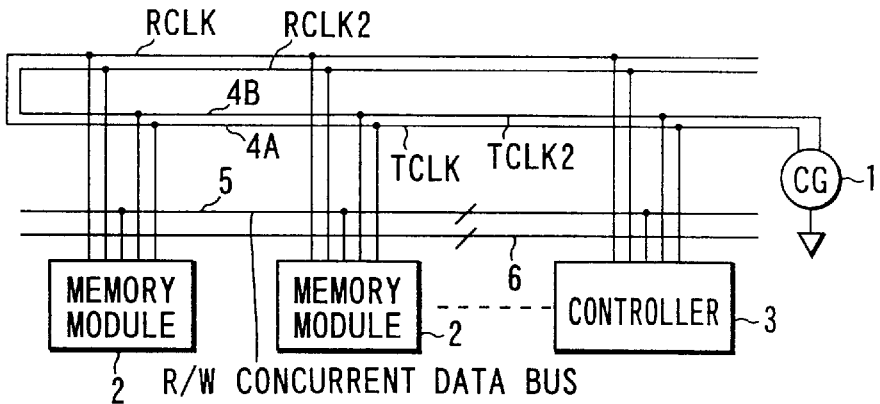

Referring now to FIGS. 5A and 5B, there are illustrated, in block diagram form, the whole configuration of a fast data transfer system according to a first embodiment of the present invention.

The system of FIG. 5A comprises a clock generator (CG) 1, a plurality of memory modules 2, a controller 3, two clock lines 4A and 4B, a data bus 5, and a command/address bus 6. The memory modules 2 and the controller 3 are arranged in parallel. The two clock lines 4A and 4B are each arranged along the arrangement of the memory modules and the controller so that they go and return. The data bus 5 and the command/address bus 6 run along the arrangement of the memory modules and the controller.

The clock generator 1 generates a first basic clock TCLK for inherently controlling data transfer and a second basic clock TCLK2 having twice the cycle period of the first basic clock TCLK. The first and second basic clocks are entered into the ends of the go line portions of the respective clock lines 4A and 4B and then transferred along the arrangement of the memory modules 2 and the controller 3. After passing through the turnaround point from the go line portions to the return line portions, the first and second basic clocks are transferred, as return clocks RCLK and RCLK2, along the arrangement of the controller 3 and the memory modules 2 in the direction opposite to the direction in which they are transferred on the go line portion and then arrive at the location in the vicinity of the clock generator 1.

The first and second basic clocks TCLK and TCLK2 on the go line portions and the first and second basic clocks RCLK and RCLK2 on the return line portions are fed into the memory modules 2 and the controller 3, which control their respective data input/output operations in synchronism with these clocks.

The memory modules 2 and the controller 3 are connected with the data bus 5, which makes data transfers on the basis of currents of given magnitude flowing therethrough so as to permit write data and read data to be transferred concurrently in two directions. In transferring data, the controller 3 outputs addresses and commands, which are entered into the memory modules 2 via the address/command bus 6.

FIG. 5A shows a case where the controller 3 is located in the vicinity of the turnaround point, however, this is not restrictive. As shown in FIG. 5B, the controller 3 may be located in the vicinity of the clock generator 1.

Description will given below of whether the system thus configured can make data transfers without the occurrence of data collisions on the data bus and the occurrence of any gap in data transfer even if a phase difference of less than 360 degrees*2, namely, less than two cycle periods of the clock TCLK, occurs between the clock TCLK on the go line portion and the clock RCLK on the return line potion. To transfer data that is collision- and gap-free data transfers, it suffices to set up intermediate timing M between the clocks TCLK and RCLK which are out of phase with each other. The setup of the intermediate timing M allows the clocks TCLK and RCLK of the same period to be related to each other. Thereby, the memory modules at different locations on the data bus can make data transfers without data collisions and any gap in data transfer. A specific method and circuit for setting up the intermediate timing M will be described in detail later.

Figure 6:
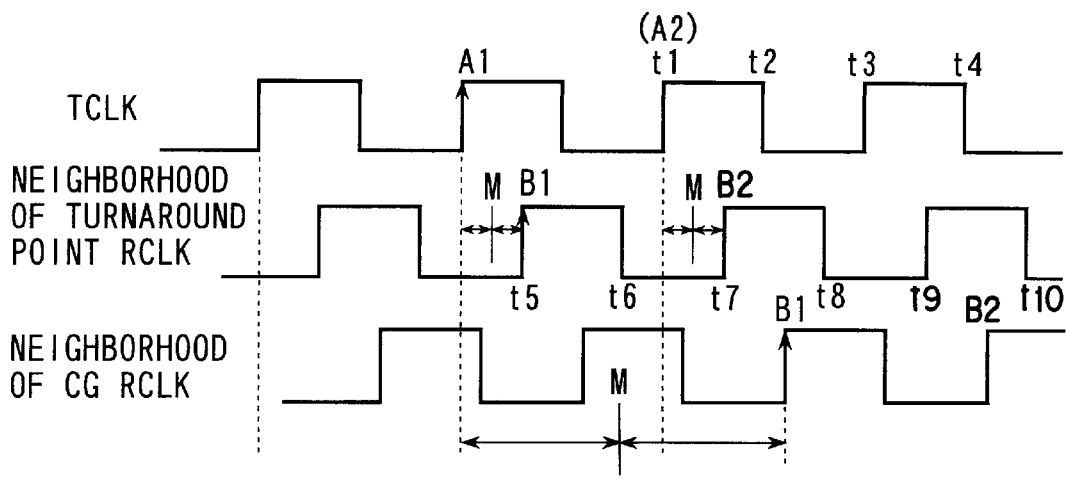
FIG. 6 is a timing chart illustrating a phase relationship between clocks TCLK and RCLK at two different locations on the clock line in the system of FIGS. 5A and 5B.

FIG. 6 shows a phase relationship between the clocks TCLK and RCLK at two different locations on the clock line 4A. In the same clock cycle, the position of the timing A of the positive-going edge of the clock TCLK on the go line portion corresponds to the position of the timing B of the positive-going edge of the clock RCLK on the return line portion. When, at locations near to and far from the turnaround point of the clock line, reference is made to the clock TCLK at each of the locations, the phase relationship among the timing A, M, and B becomes as shown in FIG. 6.

As described previously, there are two cases with the clock generator 3: one where it is located in the vicinity of the turnaround point as shown in FIG. 5A, and one where it is located in the vicinity of the clock generator 1 as shown in FIG. 5B.

Figures 7, 8:
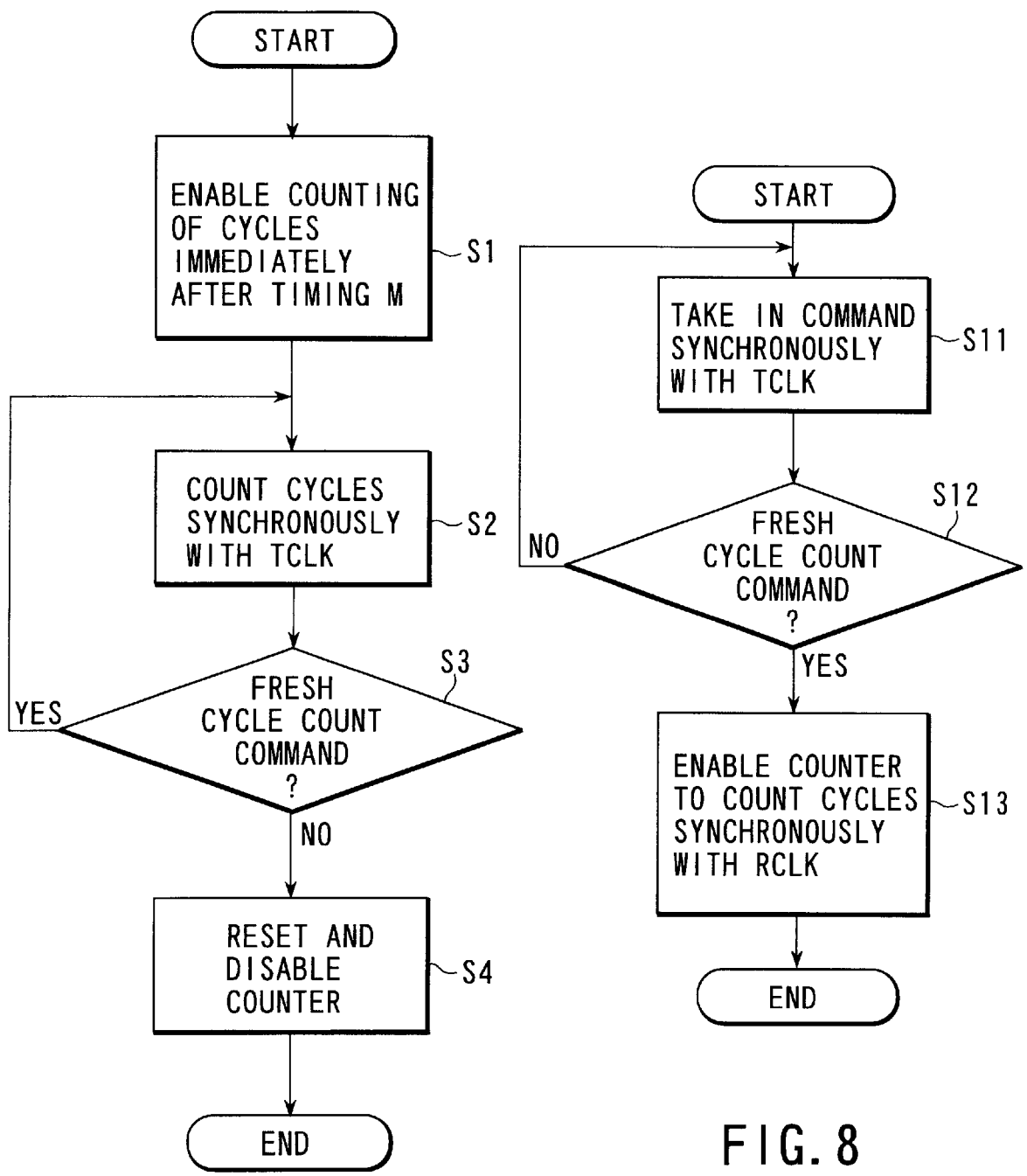
FIG. 7 is a flowchart illustrating the operating procedure of the system of FIG. 5A.
FIG. 8 is a flowchart illustrating the operating procedure of the system of FIG. 5B.

When the controller 3 is located in the neighborhood of the turnaround point, the clock transferred in the direction from the memory modules 2 to the controller 3 is the clock TCLK on the go line portion, while the clock transferred in the direction from the controller to the memory modules is the clock RCLK on the return line portion. After receipt of the clock TCLK transferred over the go line portion, the controller 3 commences access to a memory module (outputting of an address/command, etc.). On the other hand, each memory module commences a data output operation after receiving the clock RCLK transferred over the return line portion. That is, if each memory module responds to an address/command received at the timing B of the positive-going edge of the clock RCLK and outputs data onto the data bus 5 in synchronism with the clock TCLK with the timing A of the positive-going edge of the clock TCLK taken as a starting point, then no data collision will occur on the data bus and no empty cycle will be produced in data the controller receives. This will be described later with reference to a flowchart of FIG. 7.

Each memory module receives an address/command at timing B and then outputs data onto the data bus 5 after a fixed number of clock cycles from timing A, i.e., after the so-called latency. In that case, in starting a new data output cycle after termination of outputting of a set of data items, each memory module is required to count the clock TCLK by the number corresponding to a latency in order to set that latency. As will be described later, each memory module has a counter for setting the latency. The control procedure for controlling the operation of that counter will be described below with reference to FIG. 7.

(1) First, the counter is enabled to count the number of cycles immediately following timing M (step S1).

(2) Then, the counter starts counting the number of cycles in synchronism with each of positive-going and negative-going edges of the clock TCLK entered immediately after timing M (step S2).

(3) A decision is made as to whether a command captured in synchronism with the clock RCLK entered immediately after timing M is a new one to count the number of cycles (step S3). If the decision is a new command to count the number of cycles, then a return is made to step S2, so that the clock TCLK is counted again by the number required to set the latency in synchronism with the positive-going and negative-going edges of the clock TCLK.

(4) If, in step S3, the command captured in synchronism with the clock RCLK entered immediately after timing M is not a new cycle count command (including the absence of a command), then the counter is reset and disabled from counting the number of cycles (step S4).

By counting the clock TCLK cycles in accordance with the above procedure after receiving a command in synchronism with the clock RCLK, any memory module is allowed to output data onto the data bus 5 in synchronism with the clock TCLK in the same latency from timing A regardless of its location on the clock line.

For example, assume that each memory module outputs data at DDR (double data rate) and, when the latency is 2, a command corresponding to timing A1 of the clock TCLK is fed into a certain memory module at timing B1 of the clock RCLK. Then, that memory module outputs data after the clock TCLK changes two times counting from time t1 at which the clock TCLK first rises after timing A1, i.e., after timing t2 of the clock TCLK. Assume next that a command corresponding to timing t1 (timing A2) of the clock TCLK is fed into another module at timing B2 of the clock RCLK. Then, that module outputs data after the clock TCLK changes two times counting from time t3 when the clock TCLK first rises after timing A2, i.e., after timing t4 of the clock TCLK.

When data are read in this manner, no read data collision occurs on the bus and no empty cycle is produced in data that the controller receives.

Thus, the difference in location on the data bus 5 among the memory modules 2 has no effect on the operation of the controller 3 to output a command to each of the memory modules and receive corresponding data from it.

Next, description will given of the case where the controller 3 is located in the neighborhood of the turnaround point as shown in FIG. 5B. In that case, the clock transferred in the direction from the controller 3 to the memory modules 2 is the clock TCLK on the go line portion, while the clock transferred in the direction from the memory modules to the controller is the clock RCLK on the return line portion. After receipt of the clock TCLK transferred over the go line portion, the controller 3 commences access to a memory module (outputting of an address/command, etc.). If each memory module responds to a command received at the timing A of the positive-going edge of the clock TCLK and outputs data onto the data bus 5 in synchronism with the clock RCLK with the timing B of the positive-going edge of the clock RCLK taken as a starting point, then no data collision will occur on the data bus and no empty cycle will be produced in data the controller receives.

In starting a new data output cycle after termination of outputting of a set of data items, each memory module is required to count the clock RCLK by the number corresponding to a latency in order to set the latency. The control procedure for controlling the operation of that counter will be described below with reference to FIG. 8.

(1) Each memory module takes in a command in synchronism with the clock TCLK (step S11).

(2) A decision is made as to whether the command captured in step S11 is a new cycle count command (step S12).

(3) If the decision in step S12 is a new cycle count command, then the counter is enabled to count the number of cycles at time M immediately following that decision. As a result, the clock RCLK is counted by the number required to set the latency in synchronism with the positive-going and negative-going edges of the clock RCLK entered immediately after the time M (step S13).

For example, assume that each memory module outputs data at DDR (double data rate) and, when the latency is 2, a command outputted from the controller is fed into a certain memory module at timing A1 of the clock TCLK. Then, that memory module outputs data after the clock RCLK changes four times counting from time t5 when the clock RCLK first rises after timing A1, i.e., after timing t8 of the clock RCLK. Assume next that a command outputted from the controller at timing A2 of the clock TCLK is fed into another module. Then, that module outputs data after the clock RCLK changes four times counting from time t7 when the clock RCLK first rises after timing A2, i.e., after timing t10 of the clock RCLK.

When data are read in this manner, no read data collision occurs on the bus and no empty cycle is produced in data that the controller receives.

On the controller side, the timing A of the clock TCLK (e.g., timing A1 in FIG. 6) and the timing B of the clock RCLK (e.g., timing B1 in FIG. 6) are associated with each other as the clock TCLK and the clock RCLK in the same cycle because of the presence of the intermediate timing M.

Thus, the difference in location on the data bus among the memory modules has no effect on the operation of the controller to output a command to each of the memory modules and receive corresponding data from it.

Next, a specific method and circuit by which the memory modules 2 and the controller 3 set the intermediate timing M will be described.

As shown in FIGS. 5A and 5B, the first basic clocks TCLK and RCLK and the second basic clocks TCLK2 and RCLK2 are transferred over the clock lines 4A and 4B to the memory modules 2 and the controller 3.

Figure 9:
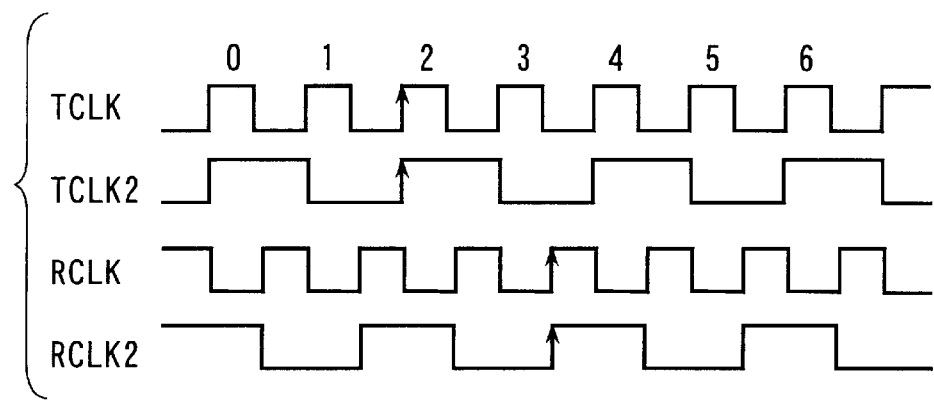
FIG. 9 is a timing chart illustrating the phases of first basic clocks TCLK and RCLK at any location on the clock line in the system of FIGS. 5A and 5B.

FIG. 9 shows phase conditions of the clocks TCLK, TCLK2, RCLK, and RCLK2 at a certain location on the clock lines 4A and 4B. As shown, cycles indicated at upward arrows are corresponding cycles before and after the turnaround point. In other words, signals indicated at upward arrows are ones in the same cycle. Since each of the second basic clocks TCLK2 and RCLK2 has twice the period of a corresponding one of the first basic clocks TCLK and RCLK, each of the first clocks TCLK and RCLK the memory modules 2 and the controller 3 receive can be divided into even-cycle clocks and odd-cycle clocks. In FIG. 9, the 0-th, 2-nd, 4-th, ... clocks are referred to as even-cycle clocks and the 1-st, 3-rd, 5-th, ... clocks are referred to as odd-cycle clocks for the sake of convenience.

Various internal clocks are produced from the clocks TCLK, RCLK, TCLK2, and RCLK2. The internal clocks associated with even cycles are represented by appending a subscript of e. The internal clocks associated with odd cycles are subscripted with o. The internal clocks having positive-going edges synchronized with positive-going edges of the basic clock are subscripted with u. The internal clocks whose positive-going edges are 180-degree out of phase with positive-going edges of the basic clock are subscripted with d.

Figure 10:
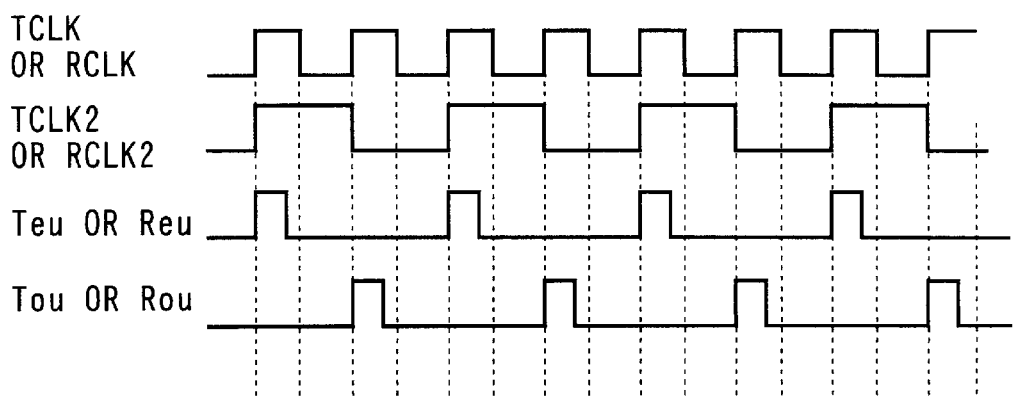
FIG. 10 is a timing chart illustrating even-numbered internal clocks Teu or Reu and odd-numbered internal clocks Tou or Rou which are produced in synchronism with the first basic clocks TCLK or RCLK in the system of FIGS. 5A and 5B.

FIG. 10 shows a phase relationship between an internal clock Teu (or Reu) associated with even cycles and an internal clock Tou (or Rou) associated with odd cycles, which are produced in synchronism with the basic clock TCLK (or RCLK). If these internal clocks are produced within the memory modules or the controller, the previously described intermediate timing M can be generated in the memory chips of the respective memory modules or the controller chip within the controller.

When a cycle (referred to as CLK2) of either the internal clock Rou or the clock RCLK is delayed by $\delta$ with respect to a cycle (referred to as CLK1) of either the internal clock Tou or the clock TCLK, the timing M corresponds to the time that is delayed by $\delta/2$ with respect to CLK1. The timing M is generated in the following way.

First, the time difference $(2\tau-\delta)$ between the period $2\tau$ twice the cycle period of CLK1 or CLK2 and the time delay $\delta$ of CLK2 with respect to CLK1 is produced. Next, the time delayed by $(\tau-\delta/2)$ with respect to CLK1 is generated. The time difference $(\tau+\delta/2)$ between this time and a certain CLK1 cycle is generated. The time that is delayed by the time difference $(\tau+\delta/2)$ with respect to the certain CLK1 cycle is generated and taken as the time delayed by $\delta/2$ with respect to CLK1.

Next, a specific method of generating the intermediate timing M using a circuit referred to as SAD (synchronous adjustable delay) will be described with reference to FIG. 11. A specific implementation of the synchronous adjustable delay, although being described in detail in our Japanese Patent Application No. 9-100490, will be described in detail later.

Assume that, as a result of the clock TCLK being transferred from the go line portion of the clock line 4A in FIGS. 5A and 5B via its turnaround point to its return line portion as the clock RCLK, a phase difference of $\delta$ is introduced between the clocks TCLK and RCLK and the phase difference $\delta$ is within the range of 0 to 360*2, namely, within two cycle periods of the clock TCLK.

Figure 11:
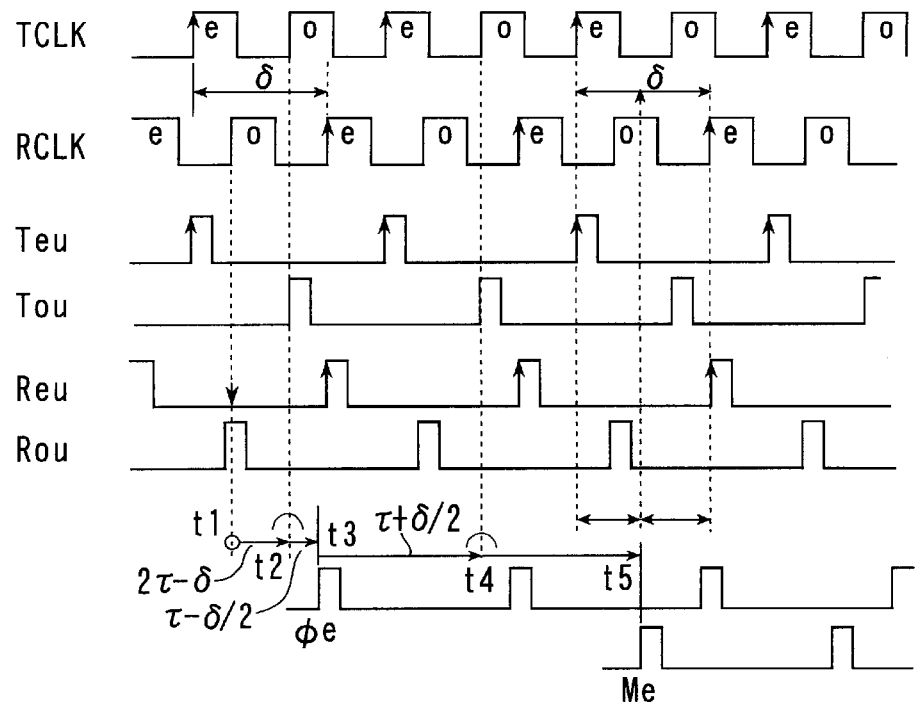
FIG. 11 is a timing chart useful in explaining a method of generating intermediate timing M shown in FIG. 6 through the use of synchronous adjustable delay in the system of FIGS. 5A and 5B.

In FIG. 11, the clocks are divided into even-cycle clocks indicated at e and odd-cycle clocks indicated at o. FIG. 11 shows the manner in which the intermediate timing Me is generated from the timing of the positive-going edge of an even-cycle clock with an upward arrow. The same is true of the odd-cycle clock case and description thereof is therefore omitted here.

First, a start is made at time t1 when an internal clock Rou rises. Using SAD, a time difference (delay time) between the positive-going edge of an internal clock Rou and the positive-going edge of an internal clock Tou generated immediately after that internal clock Rou rises is measured at time t2 when the internal clock Tou rises. After a delay of one-half of that time difference, an internal clock $\Phi$e is generated at time t3. Assuming the cycle period of the basic clock to be $\tau$, the time difference between the internal clocks Rou and Tou is $2\tau-\delta$. Thus, the interval between t2 and t3, namely, the delay time of the internal clock $\Phi$e with respect to the internal clock Tou, is $\tau-\delta/2$. Further, using SAD, a time difference between the time when the internal clock $\Phi$e rises and the time when an internal clock Tou rises immediately after the internal clock $\Phi$e rises is measured at time t4 when the internal clock Tou rises. After a delay corresponding to that time difference, an internal clock Me is generated at time t5. The time difference between t2 and t4 is equal to one cycle period of the internal clock Tou, $2\tau$. Thus, the interval between t3 and t4, namely, the amount of delay of Tou with respect to the internal clock $\Phi$e, is the time difference between t2 and t4 minus the time difference between t2 and t3, i.e., $\tau+\delta/2$. The time difference between t4 and t5 is also $\tau+\delta/2$.

Thus, the time of an internal clock Me which is displaced by $\tau+\delta/2$ with respect to the time of an internal clock Tou coincides with the time which is displaced by $\delta/2$ with respect to the time of an internal clock Teu, and the time when the internal clock Me rises is the intermediate timing to be sought that is at the center of the time interval between corresponding internal clocks Teu and Reu.

In this manner, a required intermediate timing signal is obtained in a time period corresponding to five cycles of the basic clock. By replacing the subscript e appended to the clocks used in FIG. 11 and the above description with o, an intermediate timing signal Mo is obtained whose positive-going edge is displaced by time $\delta/2$ with respect to the positive-going edge of an internal clock Tou. The intermediate timing signals Me and Mo are combined to yield intermediate timing signals.

Figure 1:
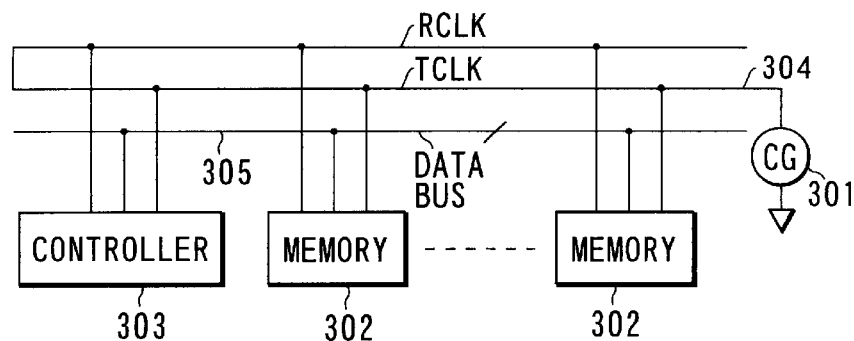
FIG. 1 is a schematic representation of a conventional data transfer system.
Figure 2:
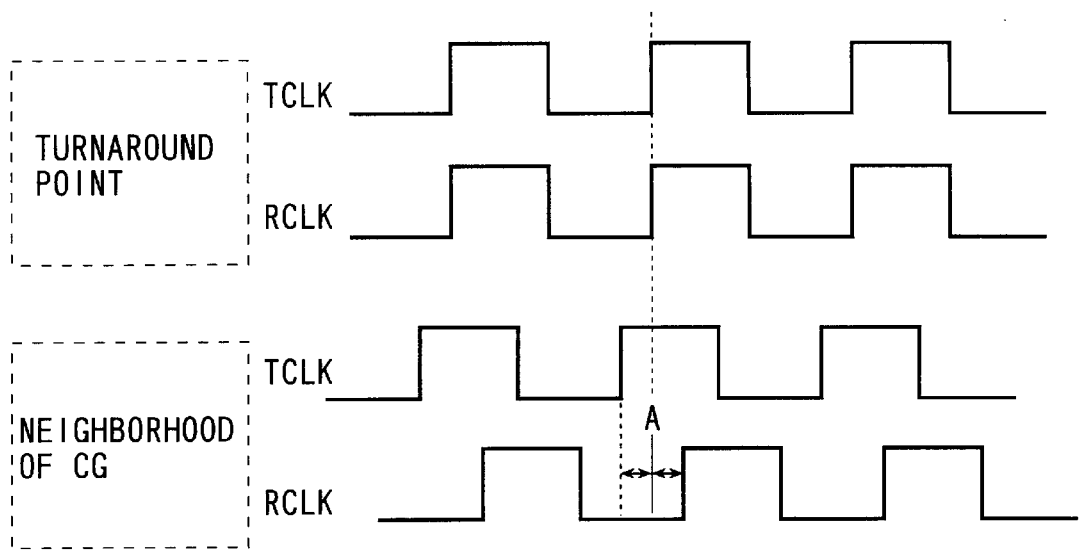
FIG. 2 is a timing chart illustrating an example of the operation of the conventional system of FIG. 1.
Figure 3:
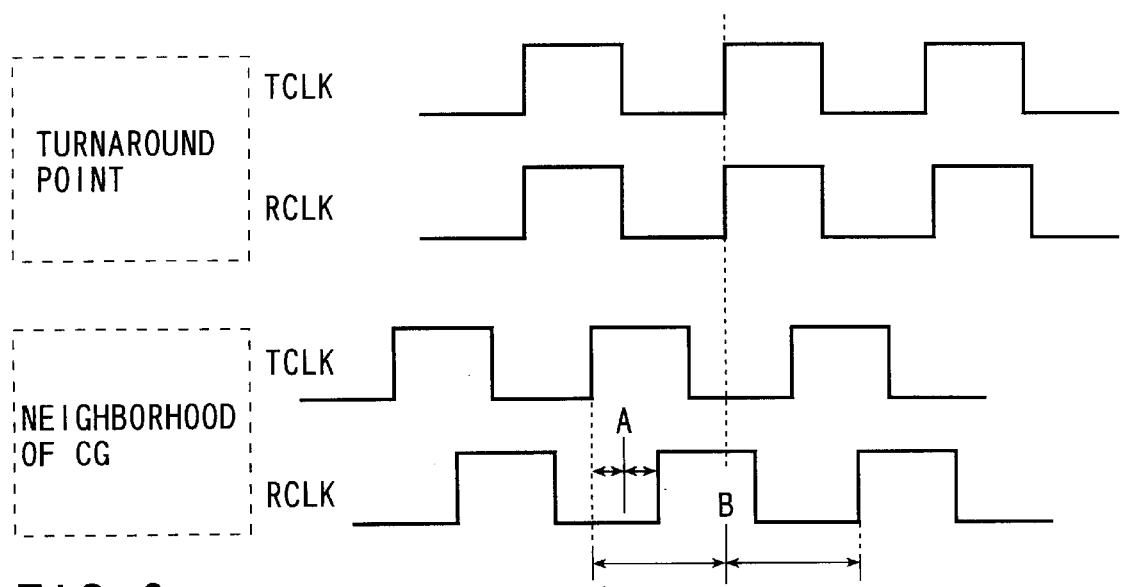
FIG. 3 is a timing chart illustrating an example of an operation differing from the operation of FIG. 2 in the conventional system of FIG. 1.
Figure 4:
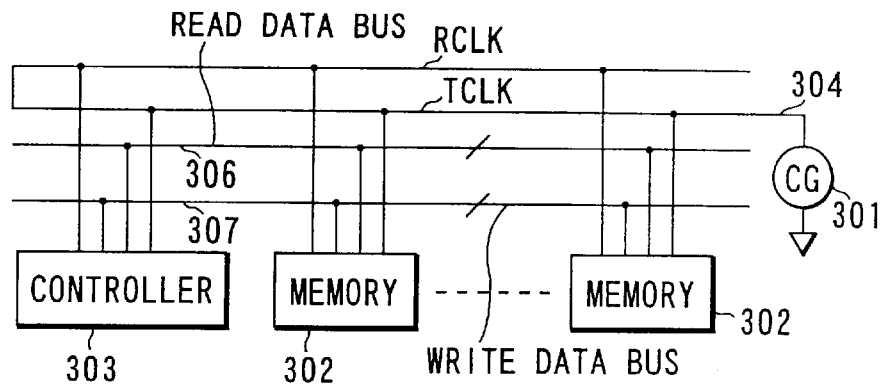
FIG. 4 is a schematic representation of a conventional data transfer system differing from that of FIG. 1.
Figure 12:
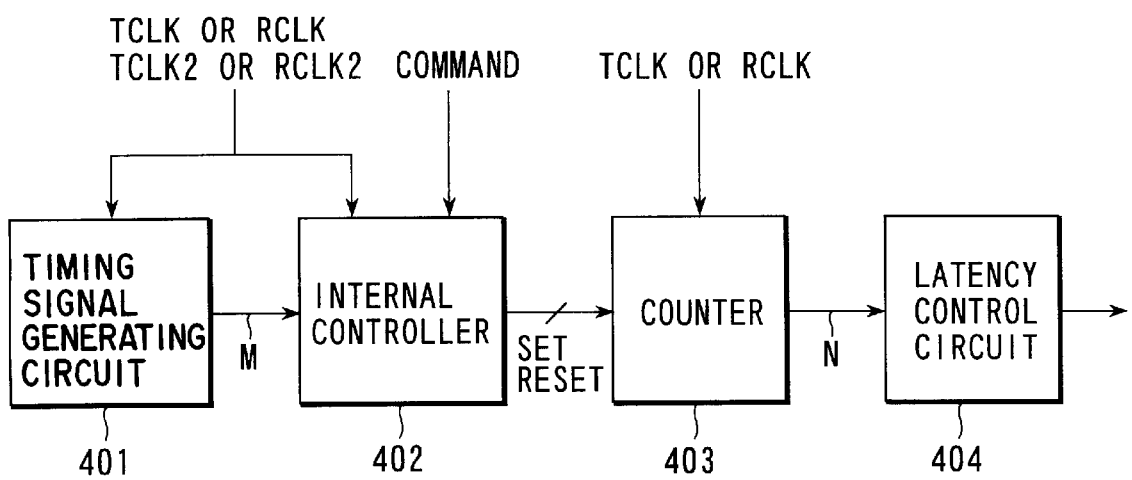
FIG. 12 is a block diagram illustrating part of internal configuration of each of the memory modules and the controller in the system of FIGS. 5A and 5B.

FIG. 12 shows the configuration of a control circuit which is built into each of the memory modules 2 and the controller 3 shown in FIG. 3 and which includes a timing signal generating circuit for generating the timing signal M, a counter responsive to the timing signal for counting the number of cycles, and a circuit responsive to the counter output for setting the latency. Specifically, the control circuit comprises a timing signal generating circuit 401 connected to receive the clocks TCLK, RCLK, TCLK2, and RCLK2 for generating the timing signal M, an internal controller 402 connected to receive the clocks TCLK, RCLK, TCLK2, and RCLK2, a command from the controller 3, and the timing signal M from the timing signal generating circuit 401 for implementing the control procedures illustrated in FIGS. 7 and 8 to generate counter set/reset signals, a counter 403 for counting the clocks TCLK or RCLK to thereby count the number of cycles, and a latency control circuit 404 responsive to a count output N of the counter 403 for setting the latency.

Although not shown, the output of the latency control circuit 404 is sent to a data input/output circuit for input/output control of data.

Figure 13:
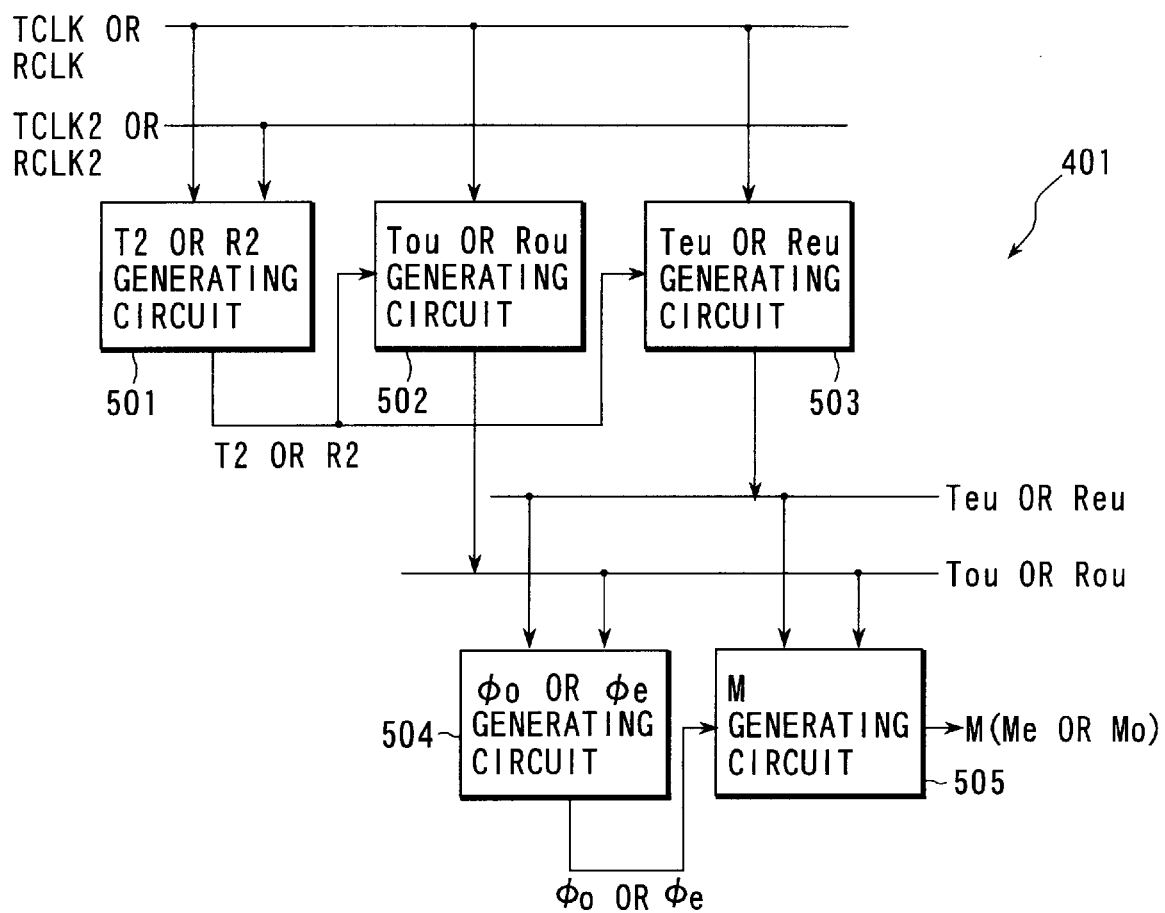
FIG. 13 is a block diagram of the timing signal generator of FIG. 12.

FIG. 13 shows a detailed block diagram of the timing signal generating circuit 401 of FIG. 12. In this figure, an internal clock T2 or R2 generating circuit 501 is connected to receive the clock TCLK or RCLK and the clock TCLK2 or RCLK2 to generate an internal clock T2 or R2. An internal clock Tou or Rou generating circuit 502 is connected to receive the clock TCLK or RCLK, the clock TCLK2 or RCLK2, and the internal clock T2 or R2 to generate an internal clock Tou or Rou. An internal clock Teu or Reu generating circuit 503 is connected to receive the clock TCLK or RCLK, the clock TCLK2 or RCLK2, and the internal clock T2 or R2 to generate an internal clock Teu or Reu. An internal clock Φo or Φe generating circuit 504 is connected to receive the internal clock Tou or Rou and the internal clock Teu or Reu to generate an internal clock Φo or Φe.

The timing generating circuit 505 is responsive to the internal clock Tou or Rou and the internal clock Φo or Φe to generate the timing signal M (Me or Mo).

The more-detailed configuration and the operation of each circuit in FIG. 13 will be described below.

Figure 14A:
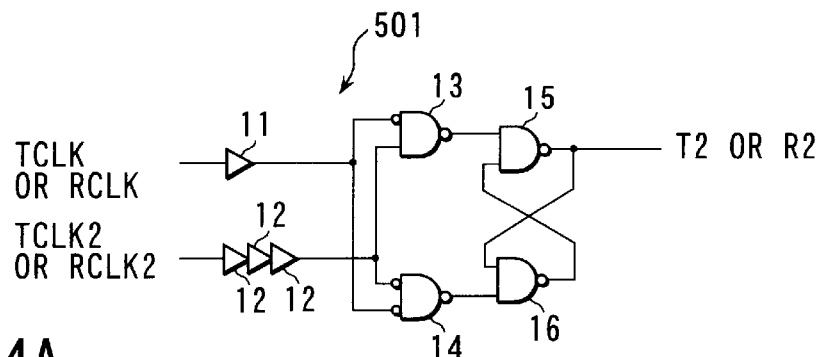
FIGS. 14A, 14B and 14C show circuit arrangements of the circuit of FIG. 13 for producing control signals T2 and R2 and internal clocks Tou, Rou, Teu, and Reu.

FIG. 14A shows a specific configuration of the circuit 501 of FIG. 13 for generating the control signal T2 or R2 to separate the basic clock cycles into even cycles and odd cycles. The T2 generating circuit and the R2 generating circuit are identical to each other in basic configuration and differ only in input signal.

The circuit 501 is composed of a buffer 11 connected to receive the clock TCLK or RCLK, buffers 12 consisting of a cascade connection of an odd number of stages (three in this example) and supplied with the clock TCLK2 or RCLK2, and four NAND gates 13 to 16.

The output of the buffer 11 is connected to one of the inverting inputs of the NAND gate 14. The output of the three-stage buffers 12 is connected to a non-inverting input of the NAND gate 13 and the other inverting input of the NAND gate 14. The output of the NAND gate 13 is connected to one of the inputs of the NAND gate 15, while the output of the NAND gate 14 is connected to one of the inputs of the NAND gate 16. The NAND gates 15 and 16 are cross-coupled with respect to their outputs and other inputs.

That is, in the circuit shown in FIG. 14A, a flip-flop consisting of the cross-coupled NAND gates 15 and 16 provides a control signal T2 or R2 for separating the basic clock cycles into even-numbered cycles and odd-numbered cycles.

Figure 15:
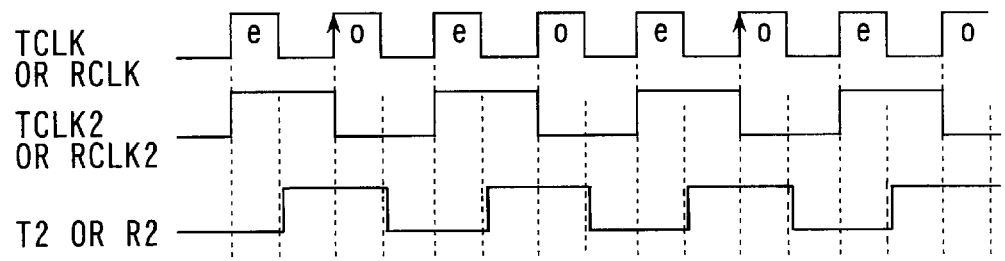
FIG. 15 is a timing chart illustrating the phase relationship of the control signal T2 or R2 produced in the circuit of FIG. 14A to the basic clock signals TCLK and RCLK.

The control signal T2 or R2, as shown in a timing chart of FIG. 15, goes to a high level when the first basic clock TCLK (RCLK) makes a transition from a high level to a low level while the second basic clock TCLK2 (RCLK2) is at the high level and then goes to the low level when the first basic clock makes a transition from the low level to the high level while the second basic clock is at the low level.

Figure 14B:
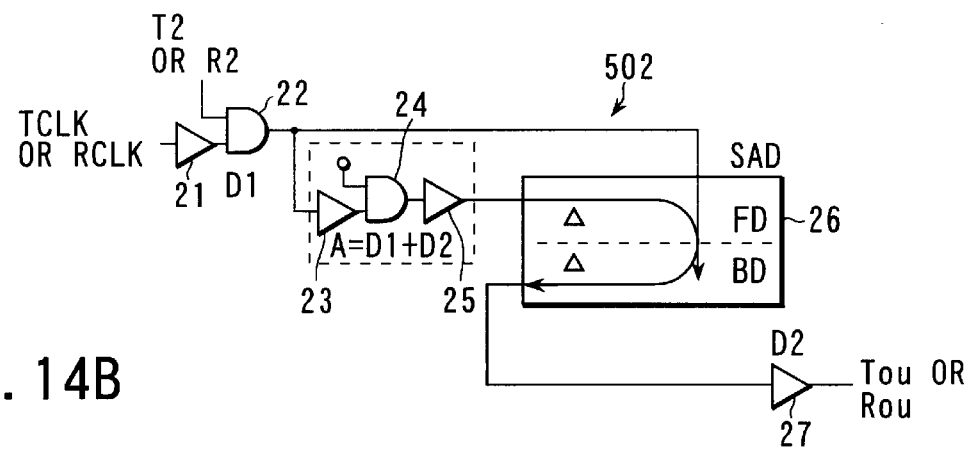

FIG. 14B shows a detailed configuration of the circuit 502 of FIG. 13 for generating the internal clock Tou or Rou. The Tou generating circuit and the Rou generating circuit are identical to each other in basic configuration and differ only in input signal.

In this circuit, the first basic clock TCLK or RCLK is applied through a buffer 21 to one of the inputs of an AND gate 22, the other input of which is connected to receive the signal T2 or R2 produced by the circuit of FIG. 14A. The output of the AND gate 22 is connected through a buffer 23 to one of the inputs of an AND gate 24, the other input of which is always supplied with a signal at a high level. The output of the AND gate 24 is connected through a buffer 25 to a forward delay circuit FD of a synchronous adjustable delay (SAD) circuit 26. The output of the AND gate 22 is connected to the SAD circuit 26 as control clock. The SAD circuit 26 has a backward delay circuit BD in addition to the forward delay circuit FD.

The forward delay circuit FD in the SAD circuit 26 has multiple delay units. An input signal to the forward delay circuit FD passes through the delay units while being delayed by each delay unit. An output signal of the buffer 25 is applied to the forward delay circuit FD. A delay time Δ involved up to the point of time at which the output of the AND gate 22 rises in the next cycle is measured in terms of the number of delay units the input signal has passed through. The corresponding delay amount is held in the forward delay circuit FD. The backward delay circuit BD delays the signal by the delay amount held in the forward delay circuit FD. The output of the backward delay circuit BD is outputted through a buffer 27 as the internal clock Tou or Rou.

Here, assume that the propagation delay time of the circuit consisting of the buffer 21 and the AND gate 22 for the first basic clock TCLK or RCLK is D1 and the propagation delay time of the buffer 27 for the output of the backward delay circuit BD is D2. Then the circuit constants of the buffer 23, the AND gate 24 and the buffer 25 are set so that the propagation delay time A of the circuit consisting of the buffer 23, the AND gate 24, and the buffer 25 for the output of the AND gate 22 becomes A=D1+D2.

The principle of operation of the signal generating circuit using such synchronous adjustable delay is described in detail in our Japanese Patent Application No. 9-100490. Hereinafter, the operation of the circuits of FIGS. 14B and 14C will be described briefly.

If the delay time A of the circuit consisting of the buffer 23, the AND gate 24 and the buffer 25 is set such that A=D1+D2, then the positive-going edges of the internal clock Tou or Rou and the positive-going edges of the odd-numbered clocks in the first basic clock TCLK or RCLK coincide in time. This is because the delay amount A+Δ is just equal to the period 2τ of the odd clock cycles of the first basic clock.

Figure 14C:
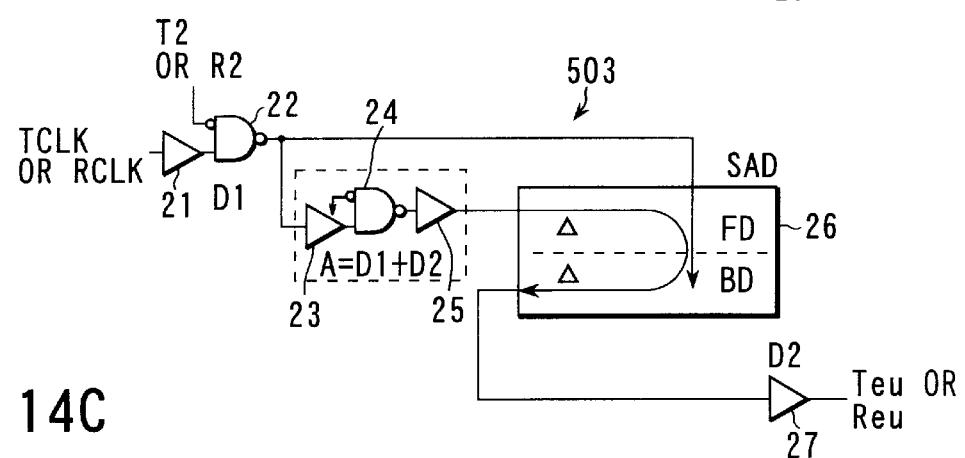

The circuit of FIG. 14C is distinct from the circuit of FIG. 14B only in that, in the circuit of FIG. 14C, the other input of the AND gate 24 is connected to ground potential at LOW level and hence the circuit is operated to respond to the first basic clock in the even clock cycles.

Figure 16A:
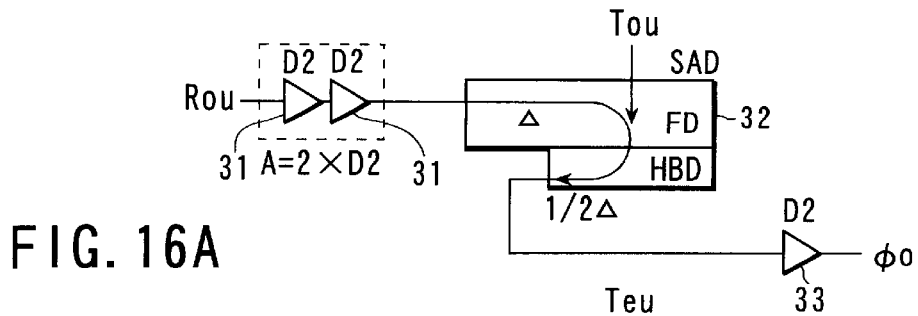
FIGS. 16A and 16B show circuit arrangements in the circuit of FIG. 13 for producing internal timing clocks $\Phi o$ and $\Phi e$.
Figure 16B:
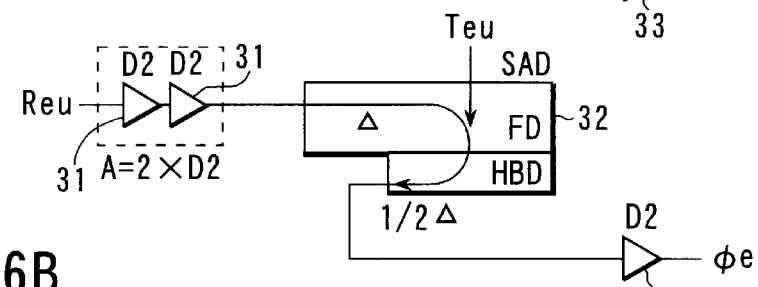

FIGS. 16A and 16B show specific arrangements of the internal clock Φe generating circuit and the internal clock Φo generating circuit shown in FIG. 13. In this case as well, both the circuits are identical in basic arrangement and differ only in input signal. Description will thus be given taking the internal clock Φo generating circuit by way of example.

The internal clock Rou is delayed by A (=2*D2) in a two-stage buffer 31 and then applied to a forward delay circuit FD in a SAD circuit 32. The internal clock Tou is applied to the SAD circuit 32. In the SAD 32, a delay amount Δ corresponding to the time interval between the moment that the internal clock Tou is applied and the moment that the internal clock is applied next is measured by the forward delay circuit FD. In the backward delay circuit BD, the number of delay units is reduced to one-half of that in the circuit FD so as to provide a delay amount half that of FD. A signal that is outputted from the SAD circuit 32 after a delay of Δ/2 from the time at which the internal clock Tou is inputted is outputted as the internal clock Φo after a delay of D2 of a buffer 33.

That is, the delay amount of the internal clock Tou with respect to the internal clock Rou is 2*D2+Δ and the delay amount of the internal clock Φe with respect to the internal clock Tou is D2+Δ/2, half of 2*D2+Δ.

In the circuit of FIG. 16B as well, the internal clock Φe is obtained from the internal clocks Reu and Teu in the same manner as above.

As shown in FIG. 11, a timing signal Me is obtained by starting the measurement of a delay amount corresponding to the time interval between the time when an internal clock Φe rises and the time when an internal clock Tou rises from the time when an internal clock Tou is inputted. Likewise, a timing signal Mo is obtained by starting the measurement of a delay amount corresponding to the time interval between the time when an internal clock Φo rises and the time when an internal clock Teu rises from the time when an internal clock Teu is inputted.

The combination of the timing signals Me and Mo provides a final timing signal M. The arrangement of a circuit for providing the final timing signal M is illustrated in FIG. 17.

Figure 17:
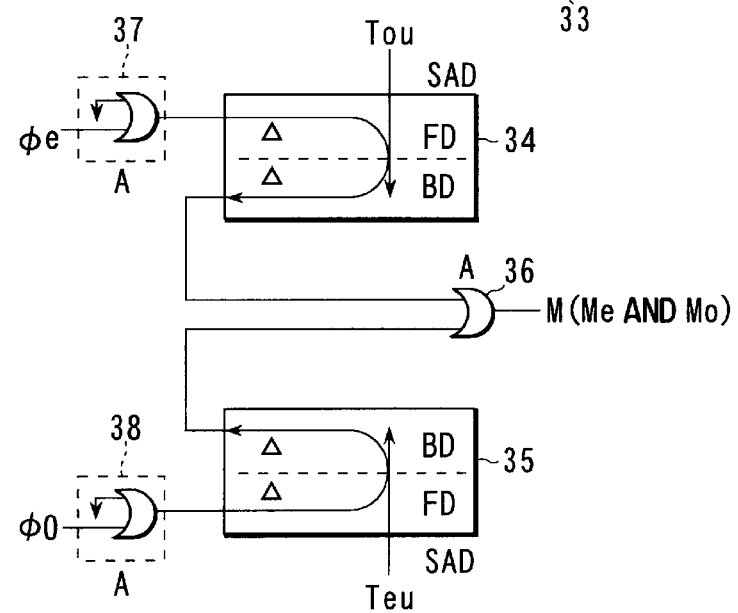
FIG. 17 shows a circuit arrangement for generating the timing M using the internal timing clocks $\Phi o$ and $\Phi e$ produced in the circuits of FIGS. 16A and 16B.

The function of the circuit of FIG. 17 remains basically unchanged from that of the circuits of FIGS. 14B and 14C. In this example, the timing signal M (Me and Mo) is obtained by ORing the outputs of two SAD circuits 34 and 35 each having a forward delay circuit FD and a backward delay circuit BD through the use of an OR gate 36. In order to match delay amounts in the input and output stages, OR gates 37 and 38 are provided at the inputs of the SAD circuits 34 and 35, respectively. The OR gate 37 is supplied with the internal clock Φe and a logical signal at a low level, while the OR gate 37 is supplied with the internal clock Φo and a logical signal at a low level. The SAD circuit 34 is supplied with the internal clock Tou as the control signal, while the SAD circuit 35 is supplied with the internal clock Teu as the control signal.

It has already been described that the determination of intermediate timing M in the timing chart of FIG. 6 allows data transfers without being affected by the location on the data bus. Some modifications to the cycle count procedure with distinction made between even and odd cycles of the basic clock allows a reduction in the circuit scale. Further, an extension to the case where the phase difference between the basic clocks TCLK and RCLK exceeds two cycle periods will also become easy.

Next, a second embodiment of the present invention will be described in which the cycle count procedure is modified.

Figure 18:
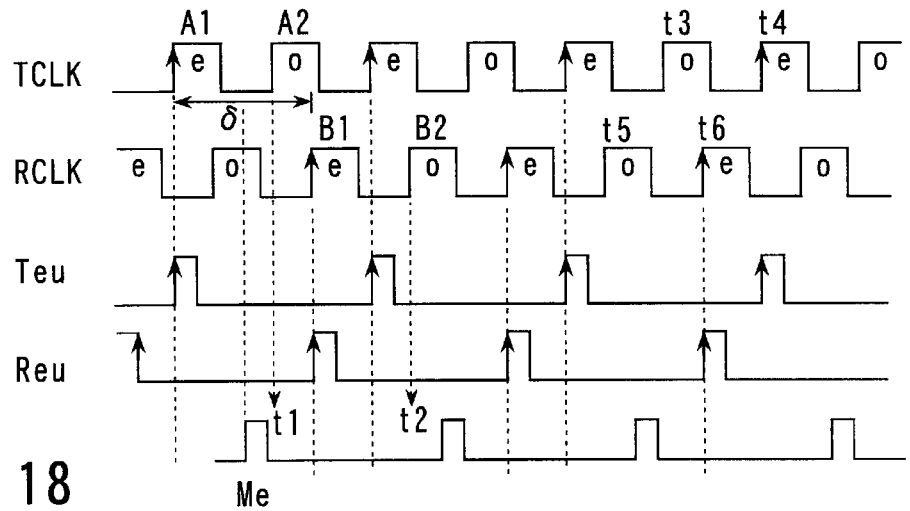
FIG. 18 is a timing chart illustrating an operation according to a second embodiment of the present invention in which only intermediate timing Me are used which is obtained from the phase difference only in even-numbered cycles (e cycles) of the basic clock in the systems of FIGS. 5A and 5B.

FIG. 18 is a timing chart illustrating a method to measure the phase difference between the basic clocks TCLK and RCLK only in even cycles of the basic clock and generate only the intermediate timing Me. The timing Me can be generated in the same way as described previously. Since there is no need to generate the timing Mo, the circuit scale is reduced by one-half over the circuits of FIGS. 16A, 16B, and 17 which have a function of generating the timing Mo.

With this timing chart, there is no need to set the timing M for each clock cycle. In this figure, an A1 cycle and a B1 cycle, an A2 cycle and a B2 cycle, are the corresponding ones and these two cycles are employed to generate the timing Me.

Figure 19:
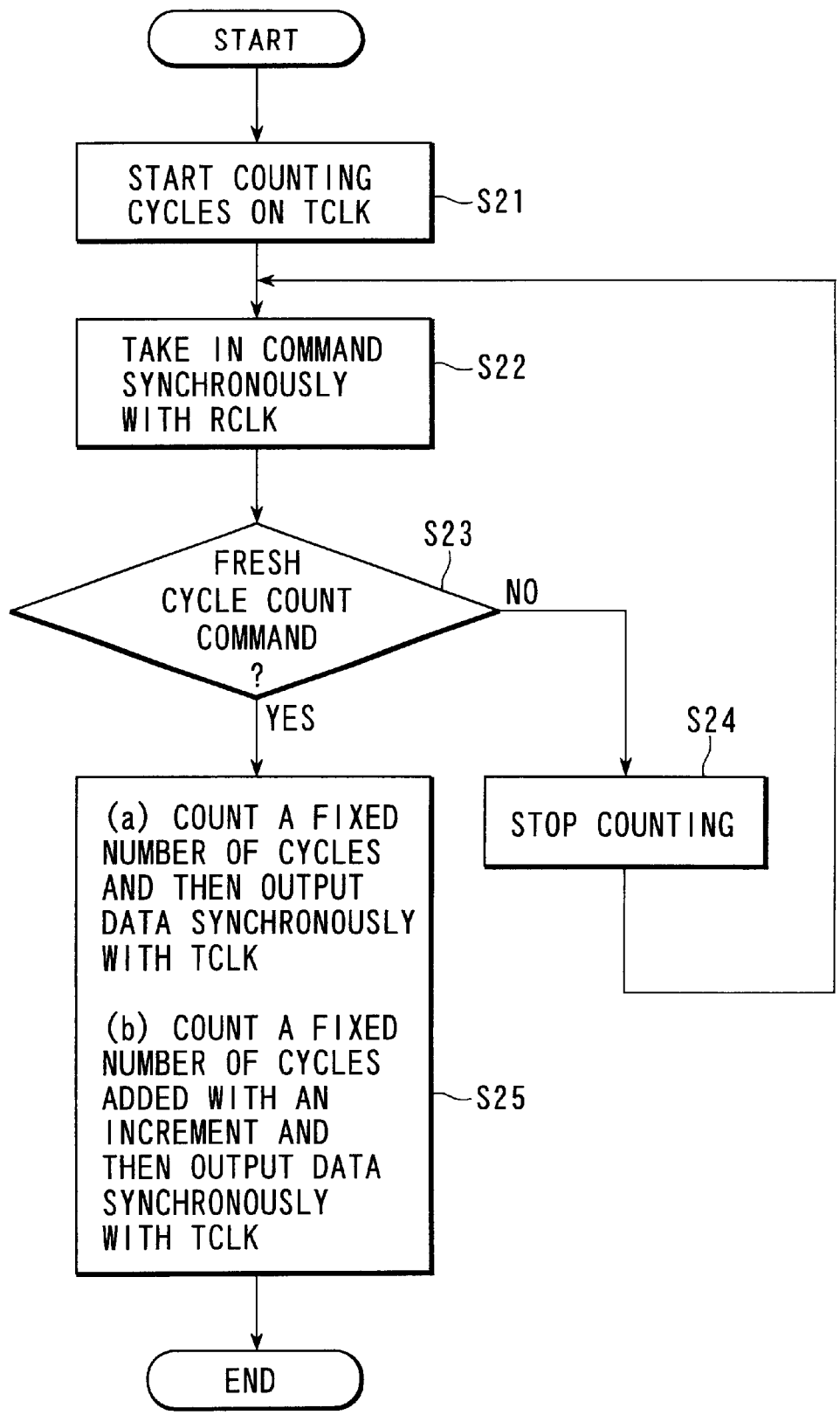
FIG. 19 is a flowchart illustrating the FIG. 5A system operation control procedure based on the method of FIG. 18.

The embodiment will be described first in terms of the case where the controller 3 is located in the vicinity of the turnaround point as shown in FIG. 5A. In this case, a command is sent from the controller 3 to a memory module 2 in synchronism with the B1 and B2 cycles in the clock RCLK. When the memory module outputs data onto the data bus 5, the cycles are counted starting at the A1 cycle and A2 cycle. After a fixed number of cycles counting from the A1 cycle and A2 cycle, data must be outputted onto the data bus 5. In starting a fresh data output cycle after a set of data items has been outputted, in order to set a latency, it is required to count the clock TCLK by the number corresponding to the latency. As described earlier, each memory module has a counter (the counter 403 in FIG. 12) for setting the latency. The control procedure for controlling the operation of that counter will be described with reference to FIG. 19.

(1) The clock TCLK is counted from the e cycle of the clock TCLK corresponding to the second timing signal Me which is generated after the first timing signal Me generated immediately after the time when the clock TCLK rises in the A1 cycle, thereby starting counting the clock cycles (step S21).

(2) A command is taken in synchronously with the clock RCLK (step S22).

(3) A decision is made as to whether the command has been taken in (step S23).

(4) If the command, taken in during the time interval between the start of the B1 cycle of the clock RCLK corresponding to the first timing signal Me and the start of the e cycle next to the B2 cycle of the clock RCLK corresponding to the second timing signal Me, is not a fresh cycle count command, including the state where there is no command, then the count operation is stopped and then preparation is made for the next count operation (step S24).

(5) (a) If, in the commands taken in during the time interval between the start of the B1 cycle of the clock RCLK and the start of the e cycle next to the B2 cycle of the clock RCLK, there is a fresh cycle count command, then a fixed number of cycles is counted and data is outputted onto the data bus in synchronism with the clock TCLK starting with the cycle at which the count operation is stopped.

(b) If, with the B1 cycle in the clock RCLK taken as the first cycle, there is a fresh cycle count command in the i-th cycle (i is a positive integer), the number of cycles to be counted is incremented by (i−1) and data is outputted onto the data bus in synchronism with the clock TCLK starting with the cycle immediately after the counting has been stopped (step S25). In the example of FIG. 18, if a command is present in the B2 cycle, the number of cycles to be counted is incremented by two.

By the above procedure, the counting is performed at times when the clock TCLK rises, allowing data to be read from each memory module in a predetermined latency. For example, assume that data each memory module outputs data at SDR (Single Data Rate) and data should be outputted onto the data bus at the start of the sixth cycle counting from the cycle when the controller 3 outputted a command. If, in this case, the controller outputs the command corresponding to the A1 cycle, then a memory module will receive this command corresponding to the B1 cycle and output data at time t3 when the clock TCLK rises. If the controller outputs a command in the A2 cycle, the memory module will receive this command in the B2 cycle and output data at time t4.

Figure 20:
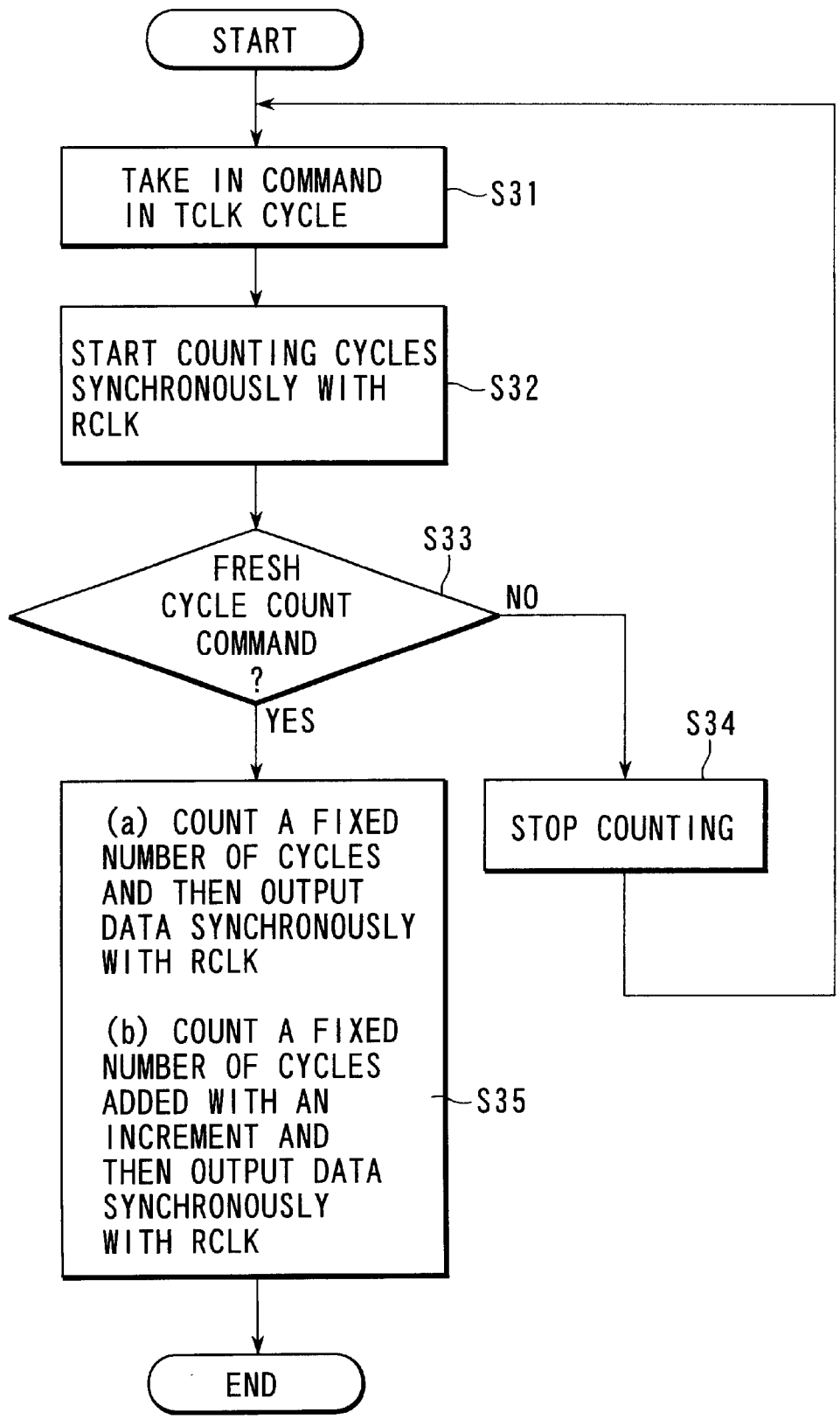
FIG. 20 is a flowchart illustrating the FIG. 5B system operation control procedure based on the method of FIG. 18.

On the other hand, when the controller 3 is located in the vicinity of the clock generator 1 as shown in FIG. 5B, a command is sent to each memory module in synchronism with the A1 and A2 cycles of the clock TCLK. In each memory module outputting data onto the data bus, the counting of cycles of the clock RCLK is initiated starting with the B1 and B2 cycles and data is outputted after a fixed number of cycles has been counted. In starting a fresh data output cycle after the termination of outputting of a set of data items, in order to set the latency, it is required to count the clock TCLK by the number corresponding to the latency. As described previously, each memory module has a counter (the counter 403 in FIG. 12) for setting the latency. The control procedure for the operation of the counter will be described with reference to FIG. 20.

(1) A command is captured in the A1 cycle of the clock TCLK corresponding to the first timing signal Me (step S31).

(2) The counter initiates the counting of cycles starting with the B1 cycle of the clock RCLK corresponding to the first timing signal Me (step S32).

(3) A decision is made as to whether a command has been taken in (step S33).

(4) If the command, taken in during the time interval between the start of the B1 cycle and the e cycle next to the A2 cycle, is not a fresh cycle count command, including the state where there is no command, then the count operation is stopped and then preparation is made for the next count operation (step S34).

(5) (a) If, in the commands taken in during the time interval between the A1 cycle of the clock TCLK and the e cycle next to the A2 cycle of the clock TCLK, there is a fresh cycle count command, then a fixed number of cycles is counted and data is outputted onto the data bus in synchronism with the clock RCLK starting with the cycle at which the count operation is stopped.

(b) If, with the A1 cycle in the clock TCLK taken as the first cycle, there is a fresh cycle count command in the i-th cycle (i is a positive integer), the number of cycles to be counted is incremented by (i−1) and data is outputted onto the data bus in synchronism with the clock RCLK starting with the cycle immediately after the counting has been stopped (step S25). In the example of FIG. 18, if a command is present in the B2 cycle, the number of cycles to be counted is incremented by two.

For example, assume that data should be outputted onto the data bus at the start of the fourth cycle counting from the cycle when the controller 3 outputted a command. If, in this case, the controller outputs the command in the A1 cycle, then a memory module will receive this command in the A1 cycle and output data at time t5. If the controller outputs a command in the A2 cycle, then the memory module will receive this command in the A2 cycle and output data at time t6.

In the example of FIG. 18, the clocks TCLK and RCLK are allowed to be displaced in phase up to two cycle periods. However, when the system is further increased in speed and scale with the result that the propagation delay on the bus becomes much larger than the period of the basic clock, it is required to accommodate phase displacements up to four cycle periods by way of example. In this case, the second basic clock, which has naturally a period quadruple that of the first basic clock, is obtained by dividing the frequency of the first basic clock by a factor of four.

Figure 21:
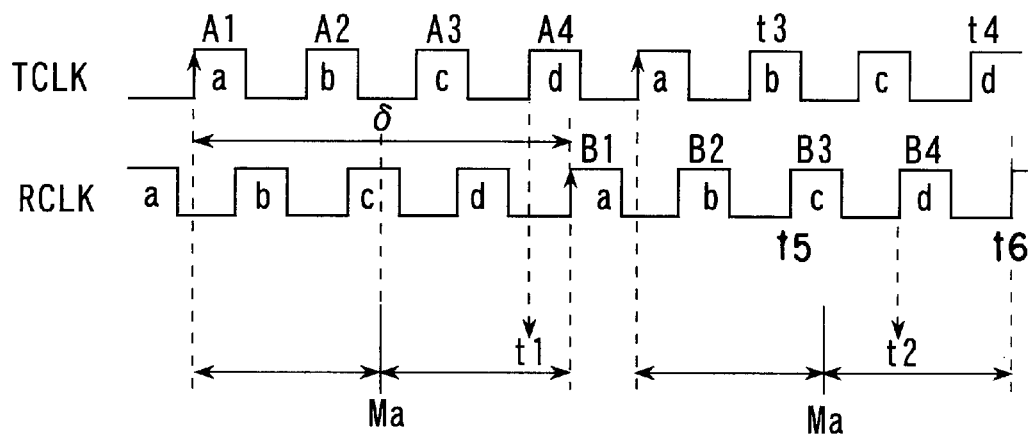
FIG. 21 is a flowchart illustrating the operation of a fast data transfer system according to a third embodiment of the present invention.

In FIG. 21, there is illustrated a timing chart, corresponding to that of FIG. 18, according to a third embodiment of the present invention in which four consecutive cycles of the first basic clock are identified as a, b, c, and d through the use of the second basic clock, thereby accommodating phase displacements up to four cycle periods of the first basic clock.

Figure 22:
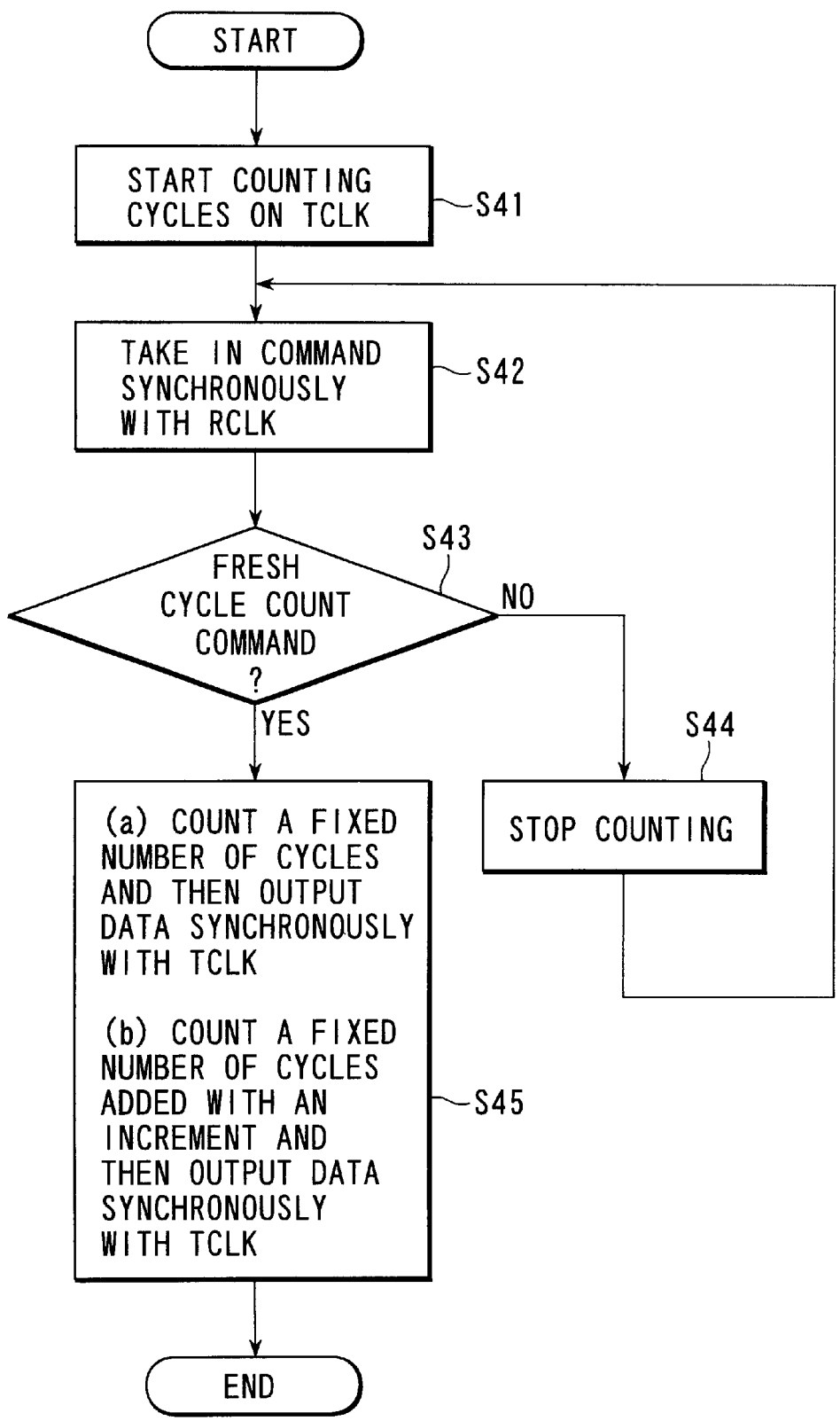
FIG. 22 is a flowchart illustrating the control procedure for the operation of the fast data transfer system of the third embodiment.

In this case, only the timing Ma corresponding to the a cycle of the four cycles of the first basic clock is generated. How to generate the timing Ma will be described in detail later. The procedure of generating the timing Ma shown in FIG. 21 is the same as in the case of FIG. 18 and is performed as follows:

First, when the controller is located in the vicinity of the turnaround point as shown in FIG. 5A, a command is sent to the memory modules synchronously with the four cycles B1, B2, B3 and B4 of the clock RCLK. The cycle when data is to be outputted onto the data bus is one reached when a fixed number of cycles of the clock TCLK is counted starting with each of the A1, A2, A3 and A4 cycles. In starting a fresh data output cycle after the termination of outputting of a set of data items, in order to set the latency, it is required to count the clock TCLK by the number corresponding to the latency. The procedure of counting the clock TCLK by the number corresponding to the latency is shown in FIG. 22.

(1) The counting of cycles is started from the clock TCLK cycle (a cycle) corresponding to the second timing Ma immediately after the first timing Ma (step S41).

(2) A command is taken in synchronously with the clock RCLK (step S42).

(3) A decision is made as to whether the command has been taken in (step S43).

(4) If the command, taken in during the time interval between the clock RCLK cycle (B1 (a) cycle) corresponding to the first timing Ma and the clock RCLK cycle (next a cycle) corresponding to the second timing Ma, is not a fresh cycle count command, including the state where there is no command, then the count operation is stopped and then preparation is made for the next count operation (step S44).

(5) (a) If, in the commands taken in during the time interval between the clock RCLK B1 cycle (a cycle) and the a cycle next to the clock RCLK B4 cycle, there is a fresh cycle count command, then a fixed number of cycles is counted and data is outputted onto the data bus in synchronism with the clock TCLK starting with the cycle at which the count operation is stopped.

(b) If, during the time interval between the clock RCLK B1 (a) cycle and the next corresponding a cycle next to the B4 cycle there is a fresh cycle count command in the i-th cycle (i is a positive integer) with the B1 cycle taken as the first cycle, the number of cycles to be counted is incremented by (i−1) and data is outputted onto the data bus in synchronism with the clock TCLK starting with the cycle immediately after the counting has been stopped (step S45). In the example of FIG. 21, if a command is present in the B3 cycle, the number of cycles to be counted is incremented by four.

For example, assume that each memory module outputs data at SDR and data should be outputted onto the data bus at the start of the sixth cycle counting from the cycle when the controller 3 outputted a command. If, in this case, the controller outputs the command corresponding to the A1 cycle, then a memory module will receive this command in the B1 cycle and output data at time t3 when the clock TCLK rises. If the controller outputs a command in the A3 cycle, the memory module will receive this command in the B3 cycle and output data at time t4 when the clock TCLK rises.

Figure 23:
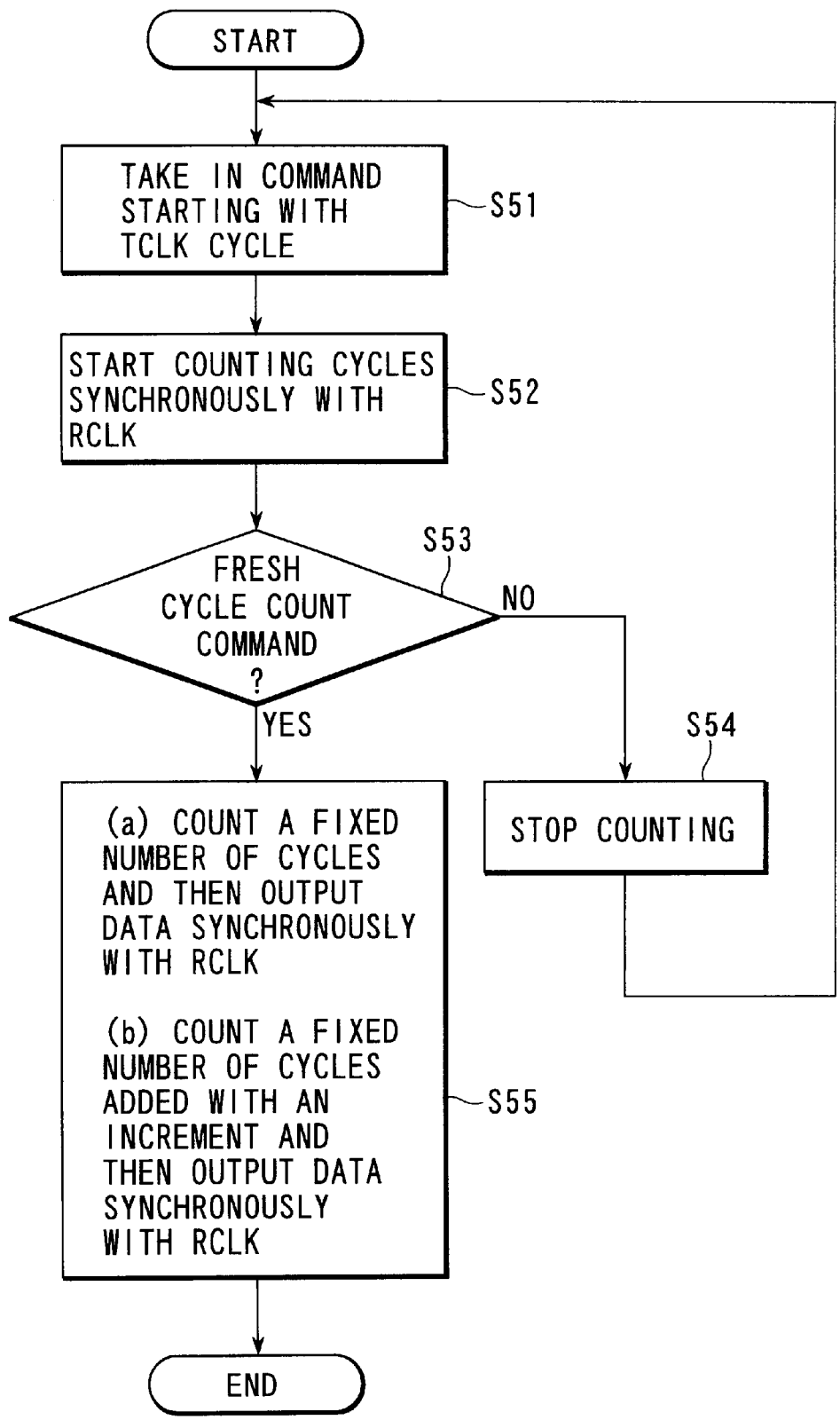
FIG. 23 is a flowchart illustrating the control procedure in the fast data transfer system of the third embodiment which differs from that of FIG. 22.

On the other hand, when the controller is located in the vicinity of the clock generator as shown in FIG. 5B, a command is issued to the memory modules synchronously with the four cycles, A1, A2, A3 and A4, of the clock TCLK. The cycle when data is to be outputted onto the data bus is one reached when a fixed number of cycles of the clock RCLK is counted starting with the B1, B2, B3 and B4 cycles. In starting a fresh data output cycle after the termination of outputting of a set of data items, in order to set the latency, it is required to count the clock RCLK by the number corresponding to the latency. The procedure of counting the clock RCLK by the number corresponding to the latency is shown in FIG. 23.

(1) A start is made in the taking in of a command from the clock TCLK A1 cycle (a cycle) corresponding to the first timing Ma (step S51).

(2) A start is made in the counting of cycles from the clock RCLK B1 cycle (a cycle) corresponding to the first timing Ma (step S52).

(3) A decision is made as to whether the command has been taken in (step S53).

(4) If the command, taken in synchronously with the clock TCLK in the a cycle next to the A4 cycle before the clock TCLK cycles corresponding to the second timing Ma, is not a fresh cycle count command, including the state where there is no command, then the count operation is stopped and then preparation is made for the next count operation (step S54).

(5) (a) If, in the commands taken in synchronously with the clock TCLK during the time interval between the clock TCLK A1 cycle and the a cycle next to the clock TCLK A4 cycle before the clock TCLK cycles corresponding to the second timing Ma, there is a fresh cycle count command, then a fixed number of cycles is counted and data is outputted onto the data bus in synchronism with the clock RCLK starting with the cycle at which the count operation is stopped.

(b) If, of the cycles before the clock TCLK cycles corresponding to the second timing Ma, there is a fresh cycle count command in the i-th cycle (i is a positive integer) with the clock TCLK A1 cycle taken as the first cycle, then the number of cycles to be counted is incremented by (i−1) and data is outputted onto the data bus in synchronism with the clock RCLK starting with the cycle immediately after the counting has been stopped (step S55). In the example of FIG. 21, if a command is present in the A3 cycle, the number of cycles to be counted is incremented by four.

For example, assume that data should be outputted onto the data bus at the start of the third cycle counting from the cycle when the controller 3 outputted a command. If, in this case, the controller outputs the command in the A1 cycle, then a memory module will receive this command in the B1 cycle and output data at time t5. If the controller outputs a command in the A3 cycle, the memory module will receive this command in the B3 cycle and output data at time t6.

Hereinafter, description will be given of a circuit that combines the second basic clock having its frequency divided by a factor of two and the second basic clock having its frequency divided by a factor of four to generate the timing Me and Ma.

Figure 24:
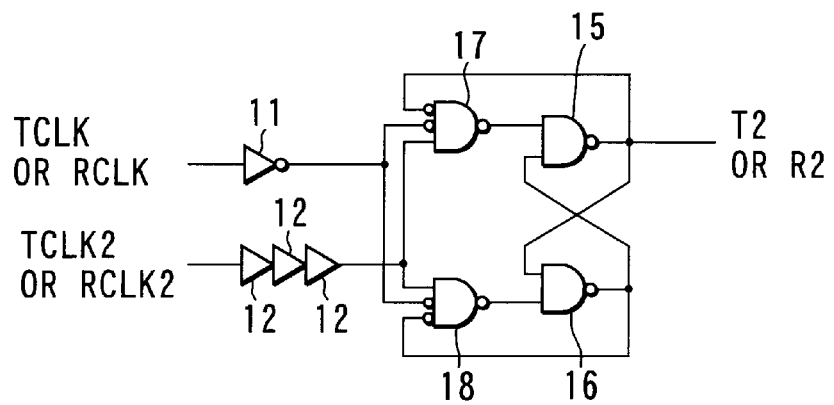
FIG. 24 shows an arrangement of a circuit in the third embodiment which corresponds to the circuit of FIG. 14A in the first embodiment.

FIGS. 14A and 14B show circuit arrangements for selecting the odd (o) cycles of the basic clock using the frequency-divided-by-two clock. In a third embodiment, the circuit of FIG. 24 corresponds to that of FIG. 14A. The circuit of FIG. 24 differs from the circuit of FIG. 14A in that the two-input NAND gates 13 and 14 are replaced with three-input NAND gates 17 and 18 and the outputs of the NAND gates 15 and 16 are fed back to inputs of the respective NAND gates 17 and 18.

Figure 25:
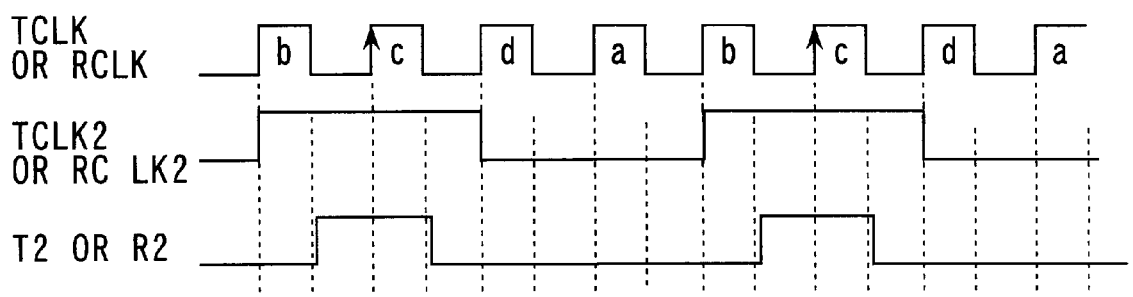
FIG. 25 is a timing chart illustrating the phase relationship of the control signal T2 or R2 with respect to the basic clock signals TCLK and RCLK.

In the circuit thus arranged, when the clock TCLK (RCLK) makes a transition from a high level to a low level while the clock TCLK2 (RCLK2) is at a high level, the control signal T2 (R2) changes its state. Thus, the circuit can produce the control signal T2 (R2) that makes changes in state as shown in FIG. 25.

Figure 26A:
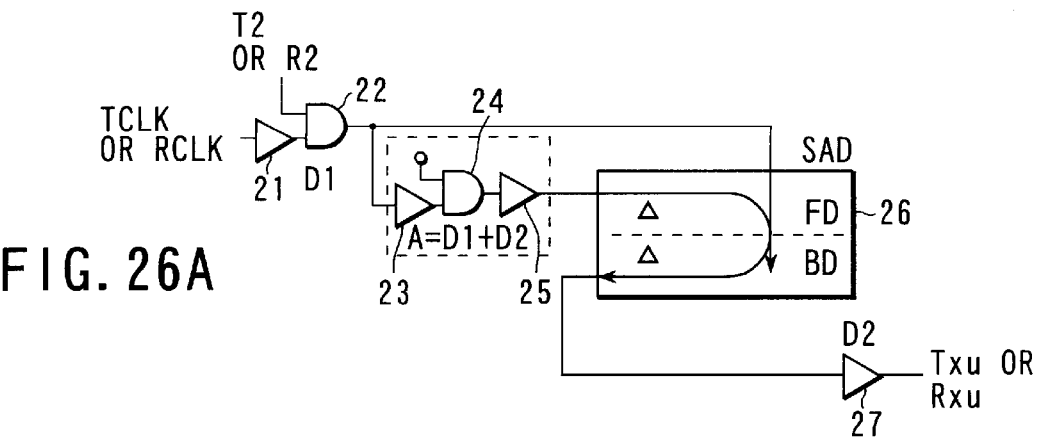
FIG. 26A shows a circuit arrangement corresponding to that of FIG. 14B or 14C.
Figure 26B:
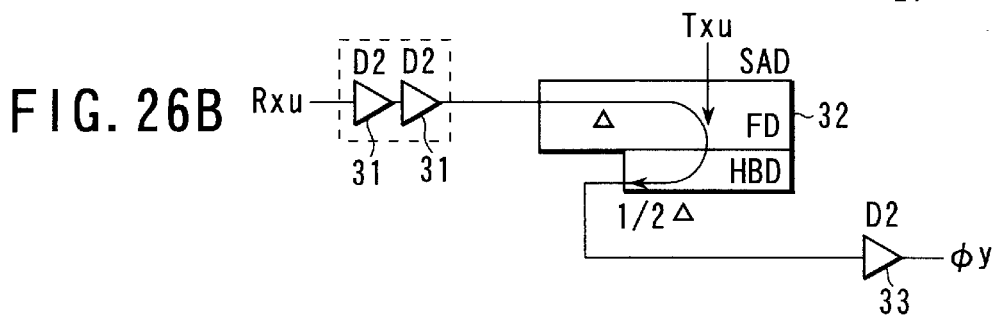
FIG. 26B shows a circuit arrangement corresponding to that of FIG. 16A or 16B.
Figure 26C:
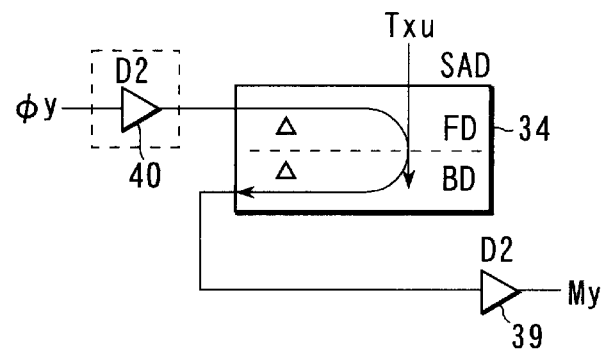
FIG. 26C shows a circuit arrangement corresponding to that of FIG. 17.

FIGS. 26A, 26B and 26C show circuit arrangements of the third embodiment that correspond to those in FIGS. 14A, 16A and 17, respectively. In these figure, like reference numerals are used to denote corresponding parts and description thereof is omitted. In these circuits, changing of the subscripts appended to signals from x to o and from y to e results in the signals shown in FIG. 18 which are obtained through the use of ½-frequency clock. In addition, changing of the subscripts appended to signals from x to c and from y to a results in the signals shown in FIG. 21 which are obtained through the use of ¼-frequency clock.

The circuit of FIG. 17 is arranged to generate the timing Mo or Me. In contrast, the circuit of FIG. 26C has only to generate the timing My only, requiring a single SAD circuit 34. On the output side of the SAD circuit 34, a buffer 39 having a delay time of D2 is used instead of the OR gate 36. For this reason, a buffer having an equal delay time is used on the input side instead of the OR gate 37.

The description up to this point relates to a technique that, in the fast data transfer system of the present invention, allows the controller to transfer data in an efficient manner and with no need of useless cycle gaps even if the location of each memory module on the data bus is not taken into consideration. A method of outputting data onto the data bus will be described next.

In the description below, as the second basic clock TCLK2 use is made of a clock which has twice the cycle period of the first basic clock TCLK and which is obtained by dividing the frequency of the first basic clock by a factor of two. An extension to the case where the second basic clock has four times the cycle period of the first basic clock TCLK is easy; thus, description thereof is omitted. The data rate is assumed to be the so-called DDR (double data rate) at which two data items are transferred with each clock cycle.

Figure 27:
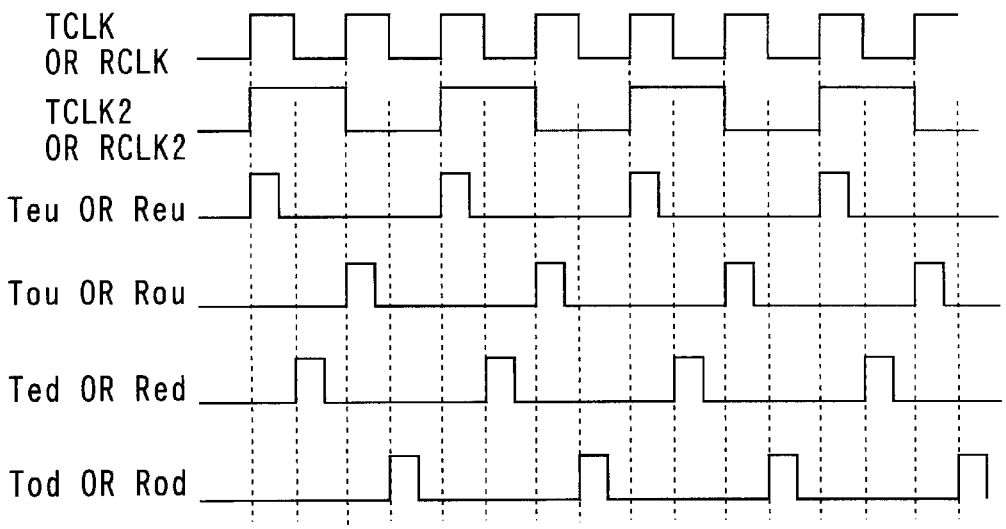
FIG. 27 is a timing chart illustrating the phase relationship among the first basic clock TCLK (RCLK), the second basic clock TCLK2 (RCLK2), and internal clocks used for input/output of data in the third embodiment.

FIG. 27 shows a timing chart illustrating the first basic clocks TCLK and RCLK, the second basic clocks TCLK2 and RCLK2, and internal clocks synchronized with the basic clocks. Here, to control the input/output of data, use is made of the internal clocks Teu and Tou which are synchronized with the even cycles and odd cycles, respectively, of the clock TCLK, the internal clocks Ted and Tod which are 180 degrees out of phase with the internal clocks Teu and Tou, and the internal clocks Reu, Rou, Red and Rod corresponding to the clock RCLK. The method of generating the internal clocks synchronized with the positive-going edges of the basic clocks has already been described in connection with FIGS. 14A, 14B, 14C, and 15. Thus, a method of generating the clocks which are 180 degrees out of phase with these internal clocks will be described with reference to FIGS. 28A and 28B.

Figure 28A:
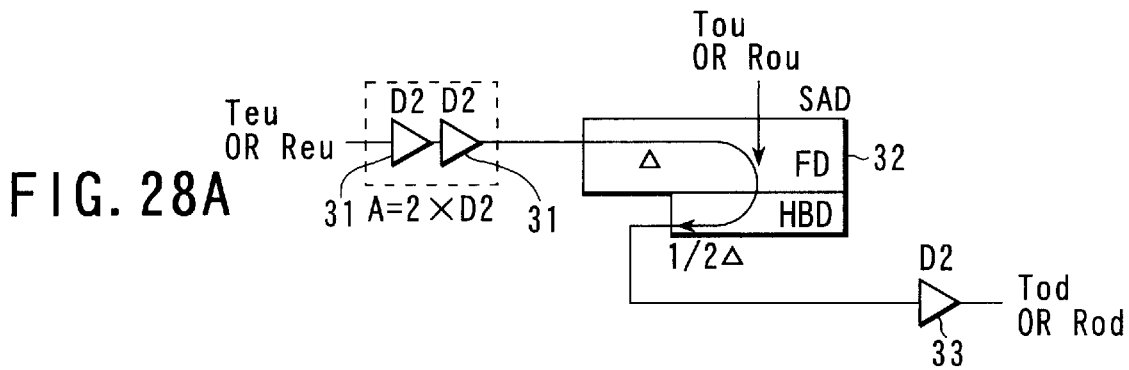
FIGS. 28A and 28B show circuit arrangements for producing the internal clocks Tod (Rod) and Ted (Red) in the third embodiment.
Figure 28B:
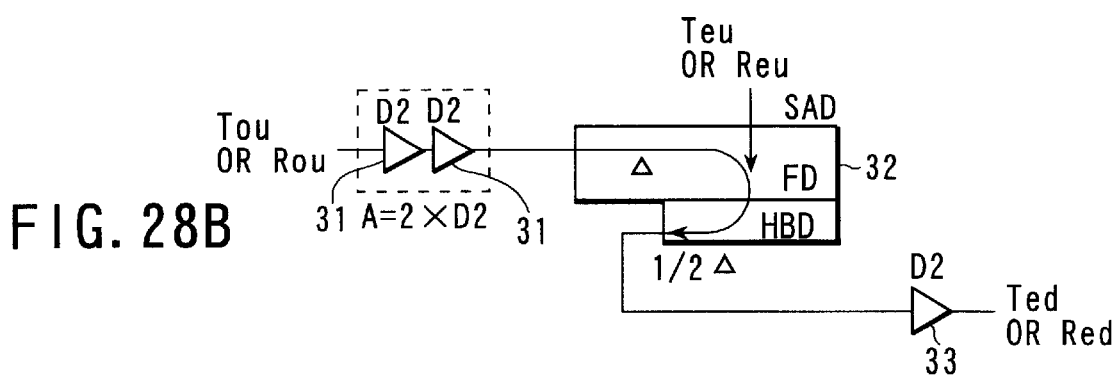

In FIGS. 28A and 28B, there are illustrated circuit arrangements which are the same as those in FIGS. 16A and 16B, respectively, except input and output signals. Thus, corresponding parts to those in FIGS. 16A and 16B are denoted by like reference numerals and description thereof is omitted.

FIG. 28A shows a circuit for generating 180-degree-out-of-phase clocks with even-cycle clocks. FIG. 28B shows a circuit for generating 180-degree-out-of-phase clocks with odd-cycle clocks. First, brief description will given of how the internal clock Tou is generated in the circuit of FIG. 28A. The internal clocks Teu and Tou, which are in phase with the basic clock TCLK or RCLK, have a phase difference of 360 degrees therebetween. In the FD of the SAD circuit 32 in FIG. 28A, the delay amount corresponding to this phase difference Δ, is measured. The HBD in the SAD 32 generates the delay amount Δ/2. The internal clock Tod from the HBD is delayed in phase by 180 degrees with respect to the internal clock Tou. Data is carried with some data window defined with respect to the timing of each positive-going edge of the basic clock and the timing 180 degrees out of phase with that timing. Thus, data can be taken in at the time generated by the circuit of FIG. 28A.

Data must be outputted in some data window defined with respect to the timing generated by the circuit of FIG. 28A. Thus, it is desirable that the timing of outputting data be set at a time midway between these times and it is required to generate internal timing 90 and 270 degrees out of phase with the basic clock.

Figure 29:
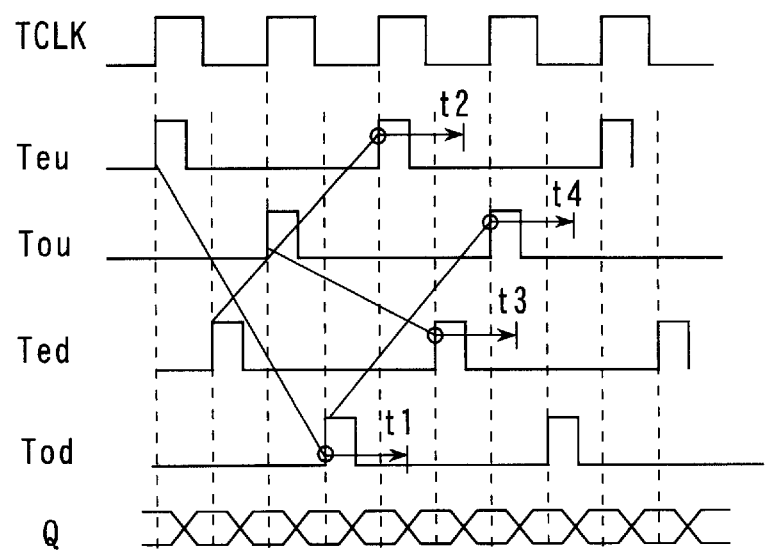
FIG. 29 is a diagram for use in explanation of a method of generating internal timing used in outputting data in synchronism with the clock TCLK in the third embodiment.
Figure 30A:
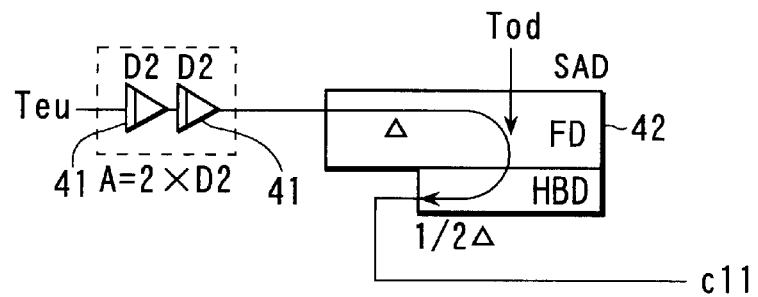
FIGS. 30A, 30B, 30C and 30D show circuit arrangements for generating timing signals c11, c12, c13, and c14, respectively, in the third embodiment.
Figure 30B:
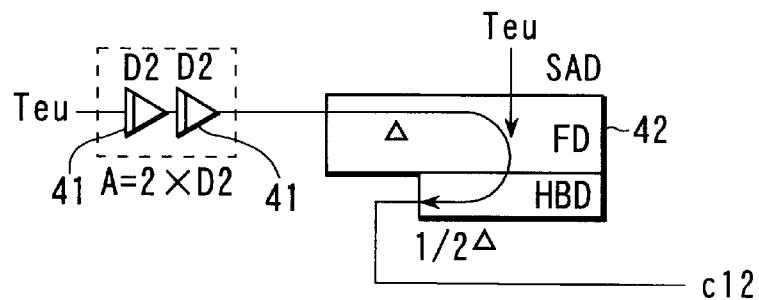
Figure 30C:
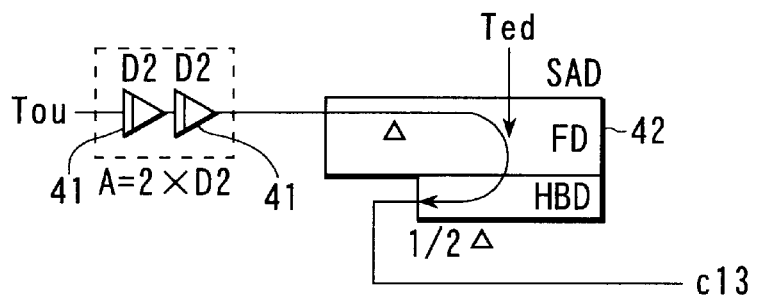
Figure 30D:
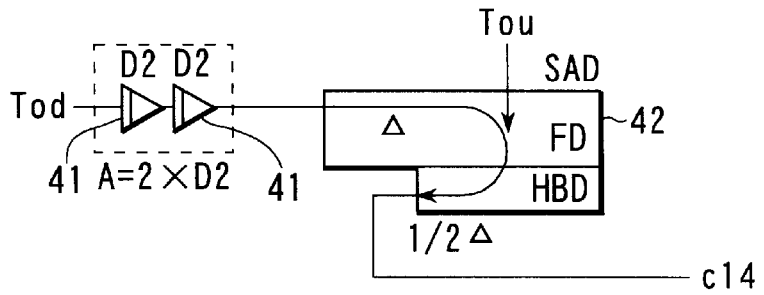

FIG. 29 shows a timing chart illustrating the method of generating the internal timing for outputting data. The internal clocks used, Teu, Tou, Ted and Tod, have already been generated.

In FIG. 29, Q indicates states of output data. Data switching is made between the times of positive-going edges of temporally adjacent internal clocks of Teu, Tou, Ted, and Tod.

By measuring the amount of delay of Tod with respect to Teu and generating the timing t1 delayed by one-half of the measured delay amount with respect to the internal clock Tod, the timing 90 degrees out of phase with the basic clock can be generated. In this case, the delay amount to be measured can be set to 3 ns or more even if the period of the basic clock is 2 ns (frequency=500 MHz). This delay amount is not extremely small.

Likewise, by measuring the amount of delay of Teu with respect to Ted and generating the timing t2 which is delayed by one-half of the measured delay amount with respect to the internal clock Teu, the timing 270 degrees out of phase with the basic clock can be generated.

Moreover, by measuring the amount of delay of Ted with respect to Tou and generating the timing t3 which is delayed by one-half of the measured delay amount with respect to the internal clock Ted, the timing 90 degrees out of phase with the basic clock can be generated.

Furthermore, by measuring the amount of delay of Tou with respect to Tod and generating the timing t4 which is delayed by one-half of the measured delay amount with respect to the internal clock Tou, the timing 270 degrees out of phase with the basic clock can be generated.

The circuit arrangements for generating these timing are illustrated in FIGS. 30A through 30D. The operation of these circuits remains basically unchanged from that of the circuits of FIGS. 16A and 16B and hence detailed description thereof is omitted. Two cascade-connected buffers 41 connected to receive a corresponding respective one of the internal clocks Teu, Ted, Tou and Tod correspond to an output buffer for outputting data. Each buffer 41 has a delay time D2 equal to the delay amount the output buffer provides.

Each SAD circuit 42 has a forward delay circuit FD and a half backward delay circuit HBD. The outputs c11, c12, c13 and c14 of the respective half backward delay circuits HBD are used as signals for driving buffers that actually output data. Data is outputted onto the data bus after a delay of DI from these signals. The description thereof is given later in conjunction with the description of a data bus that employs current so that write data and read data can be transferred concurrently in two directions.

Figure 31A:
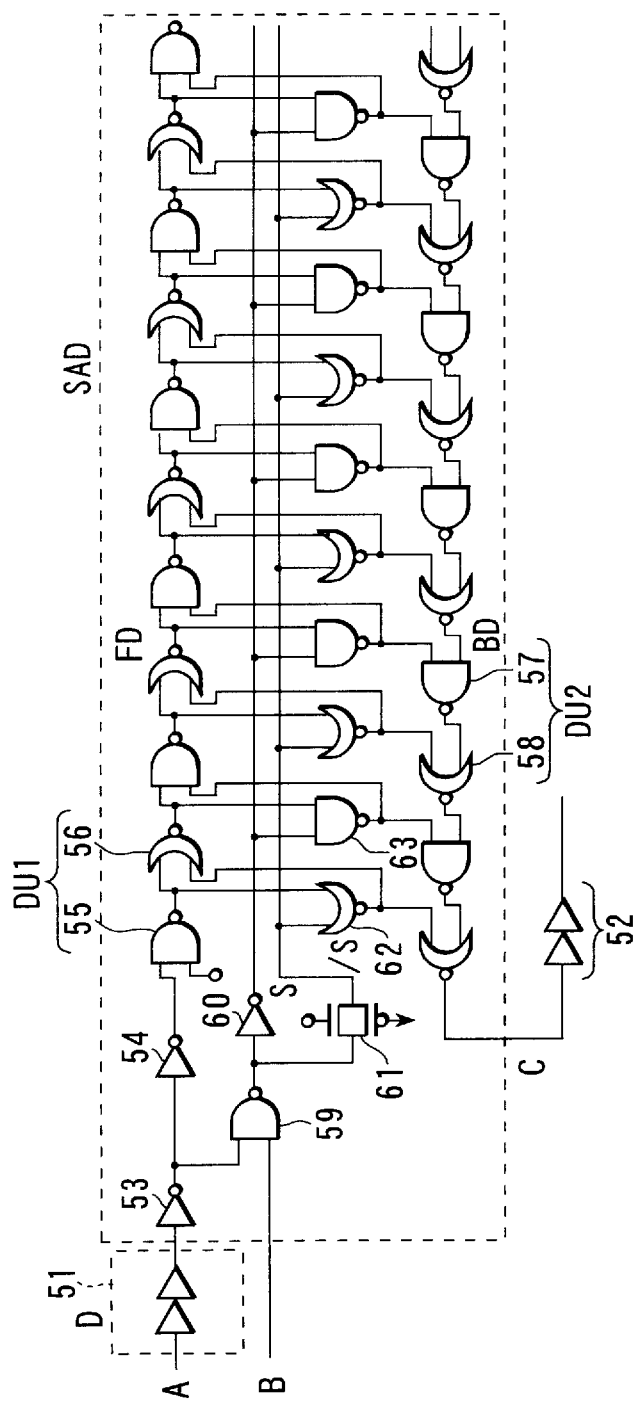
FIG. 31A shows a specific arrangement of a circuit for implementing synchronous adjustable delay used in each of the embodiments.
Figure 31B:
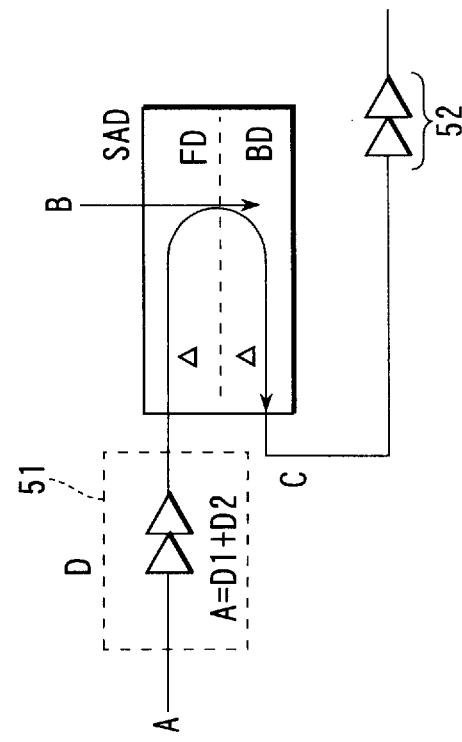
FIG. 31B shows a symbol-based circuit diagram of the circuit of FIG. 31A.

FIGS. 31A and 31B show a specific arrangement of the SAD circuit, which has not been described up to this point.

FIG. 31A shows the SAD circuit at the logic gate level, while FIG. 31B shows a symbolical representation of the circuit. In these figures, corresponding parts are denoted by like reference numerals and description thereof is omitted.

In FIG. 31A, 51 denotes an input buffer which has a delay time D (=D1+D2) and corresponds to the buffer 40 in FIG. 26C and 52 denotes an input buffer which has a delay time D and corresponds to the buffer 39 in FIG. 26C. Thus, the input A of the input buffer 51 corresponds to the signal Φy in FIG. 26C.

The SAD circuit comprises two inverters 53 and 54 connected in cascade, a plurality of cascade-connected delay units DU1 each consisting of a NAND gate 55 and a NOR gate having one of its inputs connected to the output of the NAND gate 55, an equal number of cascade-connected delay units DU2 each consisting of a NAND gate 57 and a NOR gate 58 having one of its inputs connected to the output of the NAND gate 57, a NAND gate 59 having its inputs connected to the output of the inverter 53 and the input B corresponding to the internal clock Txu in FIG. 26C, an inverter 60 connected to the output of the NAND gate 59 to produce a control signal S that is the inverse of the output of the NAND gate 59, a pass gate 61 that provides the same time delay as the inverter 60, and as many NOR gates 62 and NAND gates 63 as there are the delay units DU1 and DU2, the corresponding NOR gate 62 and NAND gate 63 being connected between the corresponding delay units DU1 and DU2.

The above-described forward delay circuit FD is constructed from the delay units DU1 and the backward delay circuit BD is constructed from the delay units DU2.

Each circuit comprising the NOR gate 62 and the NAND gate 63 performs a control operation to move a signal delayed by the forward delay circuit FD to the backward delay circuit BD at the time of the signal B. The NOR gate 62 has its input connected to s signal /S that is the inverse of the control signal S and the output of the NAND gate 55 in the corresponding delay unit DU1 and its output connected to an input of the NOR gate 58 in the corresponding delay unit DU2. The NAND gate 63 has its input connected to the control signal S and the output of the NOR gate 56 in the corresponding delay unit DU1 and its output connected to an input of the NAND gate 57 in the corresponding delay unit DU2.

In the operation of the circuit of FIG. 31A, a positive-going pulse, when applied as the input A, is entered after a delay of D into the forward delay circuit FD and then propagated alternately through the NAND gate 55 and the NOR gate 56 in each of the delay units DU1. On the other hand, a pulse is applied as the input B which sets the timing of moving the pulse propagating through the forward delay circuit FD to the backward delay circuit BD as a negative-going pulse. The time delay corresponding to the time difference between the positive-going edges of the pulse inputs A and B is measured as the location at which the pulse passing through the forward delay circuit FD rises (the location of a NOR gate 56 whose output rises or the location of a NAND gate 55 whose output falls). The positive-going pulse is moved to the backward delay circuit BD through the corresponding NOR gate 62 and NAND gate 63. The NAND gate 59 is inserted in the route between the input B and the signal S so that, when the input pulse A and the input pulse B are the same pulse, a pulse entered into the forward delay circuit FD in the previous cycle is first moved to the backward delay circuit BD and a pulse entered into the forward delay circuit FD after a delay D is not moved to the backward delay circuit BD. This disables the signal S from being outputted.

A pulse delayed by the forward delay circuit FD can be moved to the backward delay circuit BD from either the NAND gate 55 or NOR gate 56 at any location. As a result, the accuracy of delay times becomes determined by one logic gate; the NAND gate 55 or the NOR gate 56.

Figure 32A:
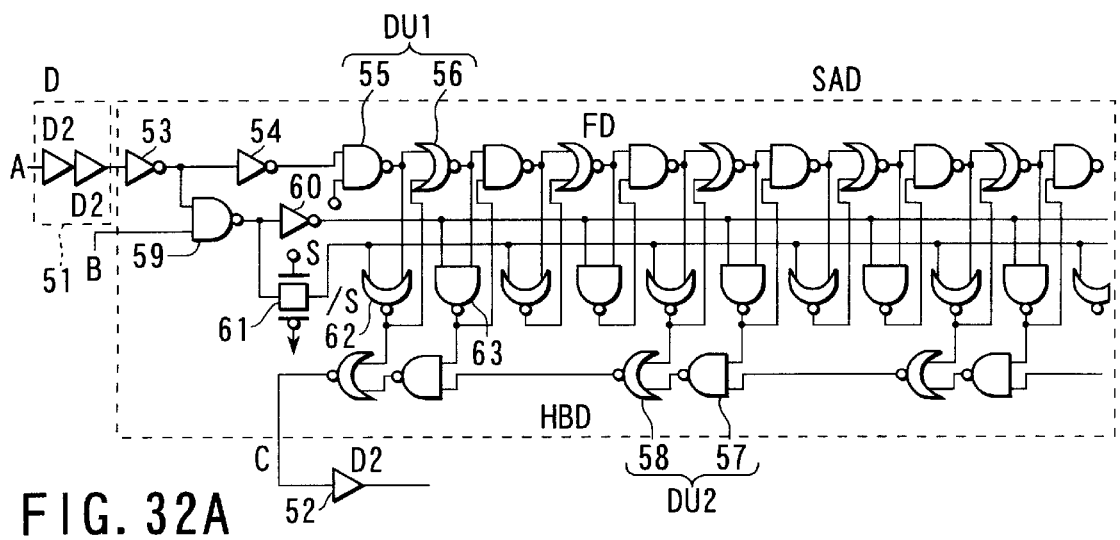
FIGS. 32A and 32B each show a specific arrangement of a circuit for implementing synchronous adjustable delay to produce a signal which is 180-degree out of phase with an input signal.
Figure 32B:
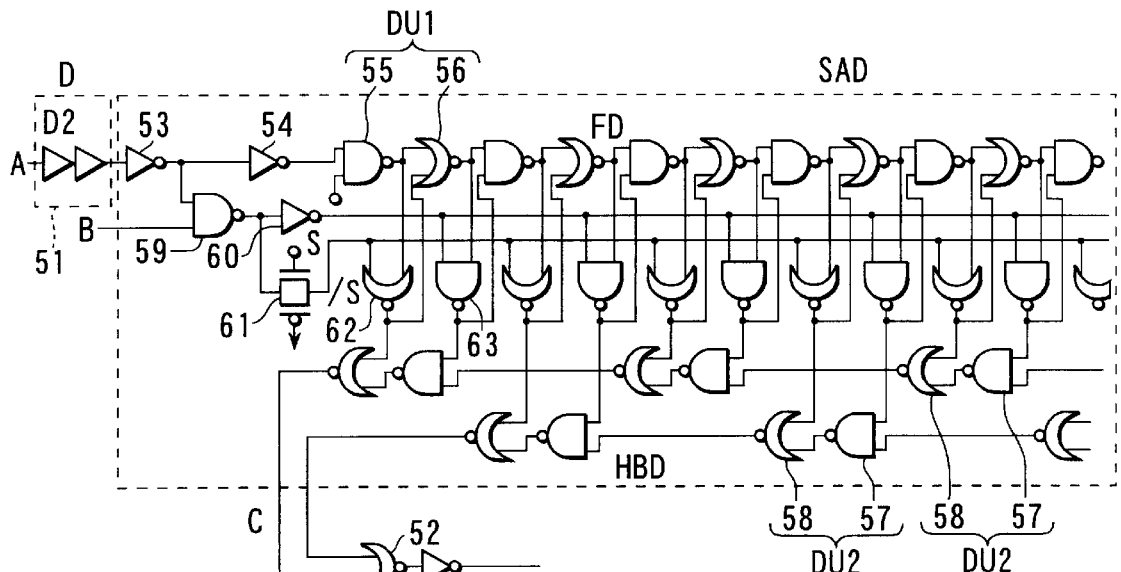
Figure 32C:
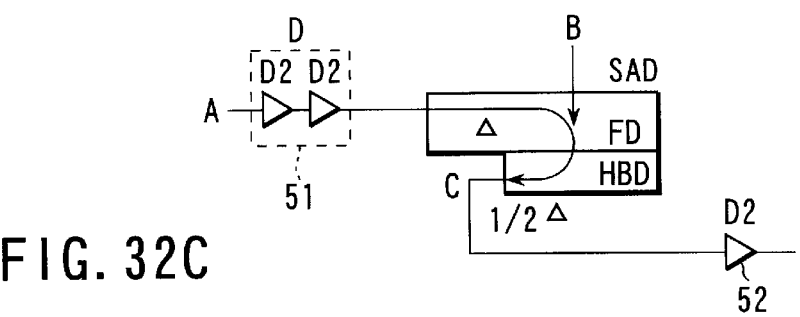
FIG. 32C is a symbol-based circuit diagram for the circuits of FIGS. 32A and 32B.

FIGS. 32A, 32B and 32C show circuit arrangements of the SAD circuit which is composed of the forward delay circuit FD and the backward delay circuit BD and which produces a signal displaced in phase by 180 degrees with respect to an input signal. FIGS. 32A and 32B show details of different circuit arrangements of the SAD circuit, and FIG. 32C is a symbolic representation of both the circuit arrangements.

The SAD circuit of FIG. 32A remains basically unchanged from that of FIG. 31A except that the backward delay circuit BD is replaced with a half backward delay circuit HBD in which the number of the delay units DU2 is reduced by half by removing every other delay unit DU2 in the backward delay circuit BD. For this reason, a pulse, after having propagated through the forward delay circuit FD, will propagate through the half backward delay circuit HBD in a time half of that involved in propagating through the backward delay circuit BD. As a result, a signal C appears delayed in phase by 180 degrees with respect to the input signal A. In this case, the output buffer circuit 52 comprises one buffer.

The SAD circuit of FIG. 32B is arranged to compensate for the coarseness of the position of pulse movement from the forward delay circuit FD to the half backward delay circuit HBD in the circuit of FIG. 32A. That is, in this example, two half backward delay circuits HBD are provided and their outputs are ORed or ANDed, thereby increasing the accuracy of delay times.

Next, an R/W concurrent bidirectional data bus (CBDB) will be described which constitutes one of great features of the present invention and allows concurrent transfer of read data and write data using a data bus common to reading and writing of data.

Figure 33:
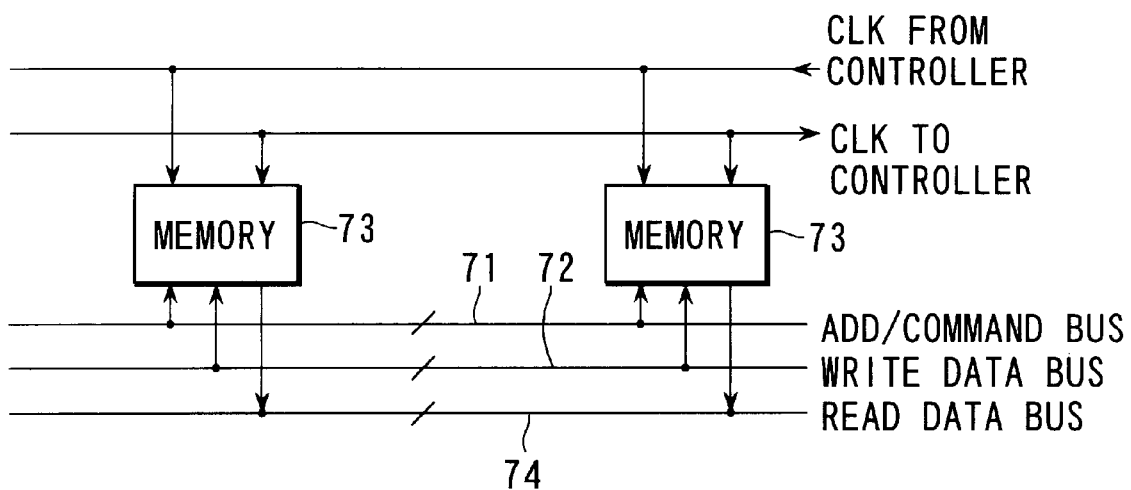
FIG. 33 shows a general data transfer system for concurrent reading and writing of data from and to memories.

FIG. 33 shows a general system for concurrently reading from and writing into memories. An address/command and write data are sent to each memory 73 over an address command bus 71 and a write data bus 72, respectively, in synchronism with clocks generated from a controller not shown. On the other hand, data is sent from each memory to the controller over a read data bus 74 in synchronism with clocks for the controller. Of course, data is communicated only between a selected memory and the controller.

With the conventional data transfer system which transfers data items "1" and "0" in the form of potential levels, in order to transfer data bi-directionally between each memory and the controller over the shared write and read data buses, it is required to time-divide the buses.

Figure 34:
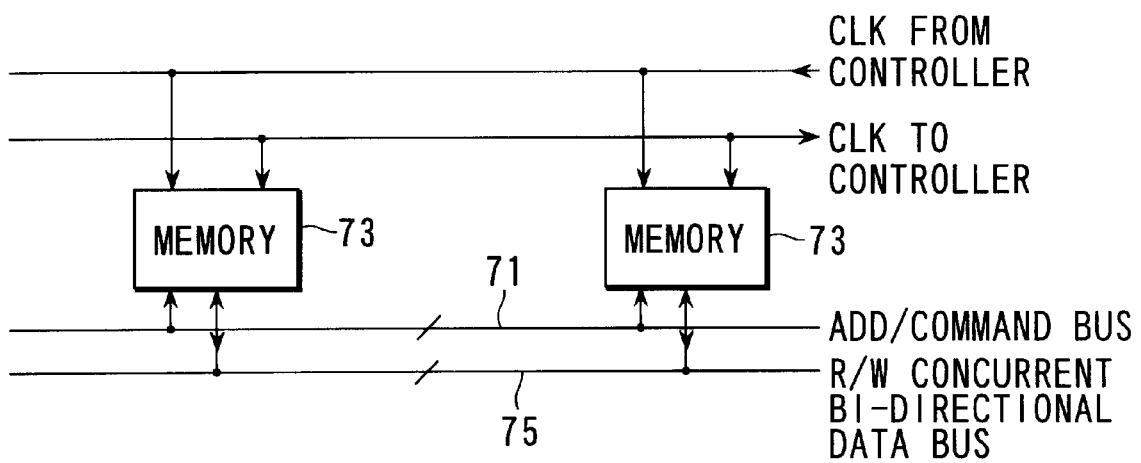
FIG. 34 shows a data transfer system of the present invention for performing reading and writing of data concurrently using currents for data transfer.

With the inventive system which transfers data in the form of current values and current flow directions rather than voltage levels, a data bus can be shared with no need of time-division as shown in FIG. 34. That is, in a system shown in FIG. 34, an R/W concurrent bi-directional data bus 75 is used in place of the write data bus 72 and the read data bus 74 in the system of FIG. 33. The current-value- and current-flow-direction-based bi-directional data transfer system has been published as "1 Gb/s Current-Mode Bidirectional I/O buffer" in 1997 Symposium on VLSI Circuit, p. 16-2. However, in this published system, nothing is connected to the data bus. The present invention is intended to apply that system to a system composed of a controller and multiple memory modules.

Figure 35:
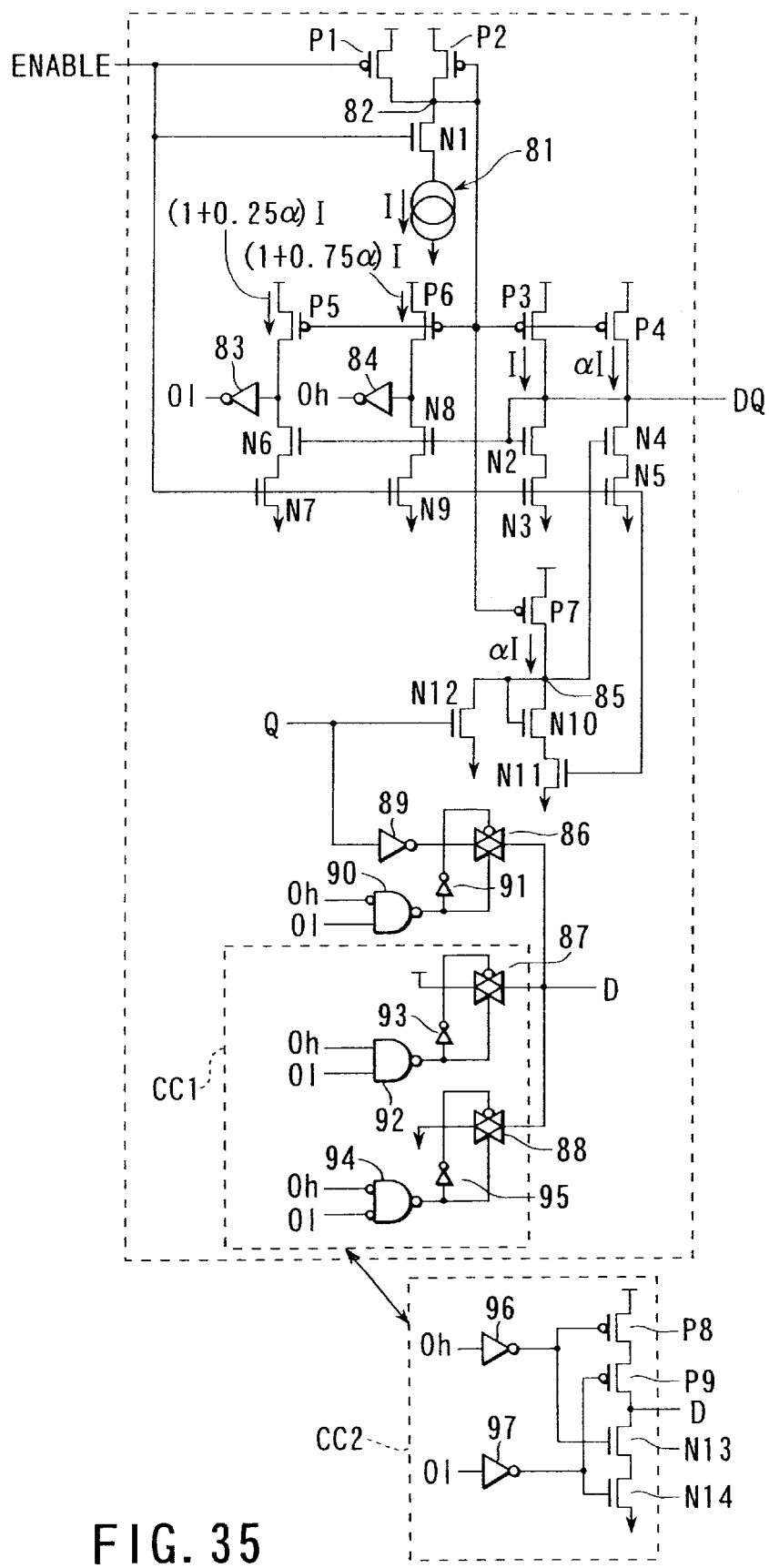
FIG. 35 shows an arrangement of a current-mode data input/output circuit installed in each of the memory modules and the controller in FIGS. 5A and 5B.
Figure 36:
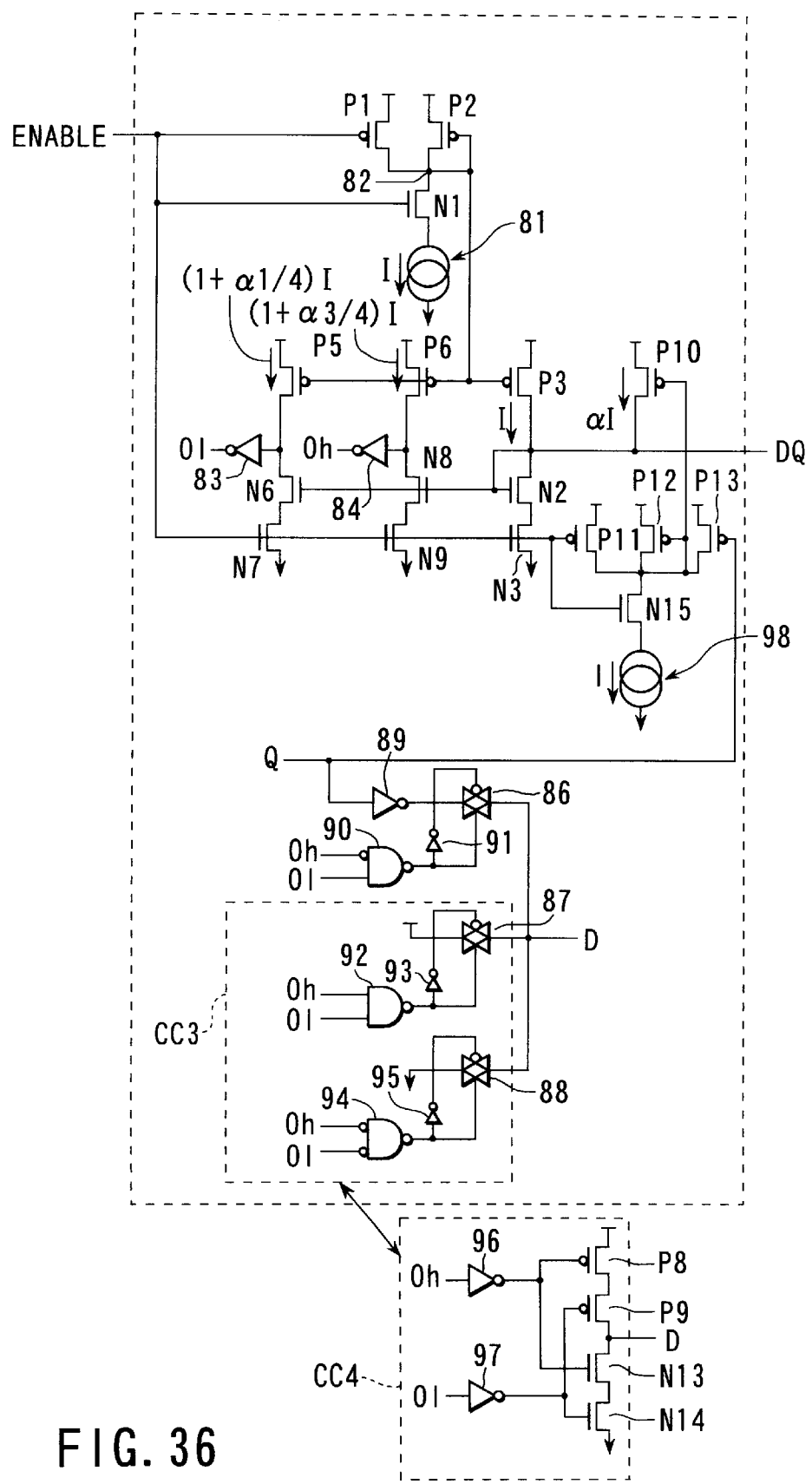
FIG. 36 shows a circuit arrangement of the data input/output circuit which is different from that of FIG. 35.

FIGS. 35 and 36 show different circuit arrangements of a current-mode data input/output circuit provided in each of the memory modules 2 and the controller 3 in FIGS. 5A and 5B.

In the data input/output circuit of FIG. 35, a data output circuit section is provided through which a current $\alpha I$ is allowed to flow all the time and the drain port for this current is turned on and off. The data input/output circuit of FIG. 36 carries out the on-off control of a current source itself of $\alpha I$.

In the system of FIG. 35, the value of current dissipated in the data input/output circuit has no output data dependence and the current paths are merely switched. Thus, there is no change in current value in a current source that causes the generation of noise, but the amount of current dissipation is large in comparison with the system of FIG. 36. In contrast, in the system of FIG. 36, the value of current in the data input/output circuit has output data dependence, but the average amount of current dissipation is small in comparison with the system of FIG. 35.

First, in the circuit of FIG. 35, 81 denotes a reference current source for generating a reference current I. Between the supply voltage node and the reference current source 81 are connected in series the source-drain paths of a P-channel MOS transistor P1 and an N-channel MOS transistor N1, which have their gates connected together to receive an ENABLE signal. Between the supply voltage node and the connection point 82 of the transistors P1 and N1 is connected the source-drain path of a P-channel MOS transistor P2, which has its gate connected to the connection point 82. Between the supply voltage node and a terminal DQ are connected in parallel the source-drain paths of P-channel MOS transistors P3 and P4 having their gate connected together to the connection point 82. Between the terminal DQ and the ground potential node are connected in series the source-drain paths of N-channel MOS transistors N2 and N3 of which the transistor N2 has its gate connected to the terminal DQ and the transistor N3 has its gate connected to receive the ENABLE signal.

Between the terminal DQ and the ground potential node are connected in series the source-drain paths of N-channel MOS transistors N4 and N5. The transistor N5 has its gate connected to the ENABLE signal.

Between the supply voltage node and the ground potential node are connected in series the source-drain paths of a P-channel MOS transistor P5 and N-channel MOS transistors N6 and N7. The transistor P5 has its gate connected to the connection point 82 and the transistor N6 has its gate connected to the terminal DQ. The transistor N7 has its gate connected to the ENABLE signal. The connection point of the transistors P5 and N6 is connected to the input of an inverter 83. Likewise, between the supply voltage node and the ground potential node are connected in series the source-drain paths of a P-channel MOS transistor P6 and N-channel MOS transistors N8 and N9. The transistor P6 has its gate connected to the connection point 82. The transistor N8 has its gate connected to the terminal DQ, and the transistor N9 has its gate connected to the ENABLE signal. The connection point of the transistors P6 and N8 is connected to the input of an inverter 84.

Between the supply voltage node and the ground potential node are connected in series the source-drain paths of a P-channel MOS transistor P7 and N-channel MOS transistors N10 and N11. The transistor P7 has its gate connected to the connection point 82. The transistor N10 has its gate connected to the connection point 85 of the transistors P7 and N10. The transistor N11 has its gate connected to the ENABLE signal. The transistor N4 has its gate connected to the connection point 85. Between the connection point 85 and the ground potential node is connected the source-drain path of an N-channel MOS transistor N12, which has its gate connected to receive output data Q.

The transistors P3, P4, P5 and P6 each form a current mirror with the transistor P2 and have their respective dimensions set so as to allow currents I, $\alpha I$, $(1+0.25\alpha)I$, and $(1+0.75\alpha)I$ to flow therethrough when the reference current I flows through the transistor P2. At data entry time, the ENABLE signal is made to go high level, so that the transistors N7 and N9 are switched on, whereupon a current proportional to a receiver current flowing into the terminal DQ flows through both the transistors N7 and N9. The inverters 83 and 84 compare the currents $(1+0.25\alpha)I$ and $(1+0.75\alpha)I$ flowing through the transistors P5 and P6 as reference currents with the receiver current flowing through the transistors N7 and N9 to thereby output data Ol and Oh. That is, data Ol is at a high level when the receiver current is higher than $(1+0.25\alpha)I$, whereas Oh is high level when the receiver current is higher than $(1+0.75\alpha)I$.

When Q, representing output data, is at a high level, the transistor N12 turns on and the connection point 85 goes to ground potential, turning the transistor N4 off. Thus, the current $\alpha I$ becomes visible to the DQ terminal. On the other hand, when data Q is low, current flows through the transistors N4 and N5 into the ground potential node. As a result, the current $\alpha I$ flows within the input/output circuit and becomes invisible to the DQ terminal.

The current flowing through each of the two data input/output circuits communicating data with each other is the sum of the current I that the reference current source 81 provides, the current I in the transistor P3, the current $\alpha I$ in the transistor P4, the current $(1+0.25\alpha)I$ in the transistor P5, the current $(1+0.75\alpha)I$ in the transistor P6, and currents flowing through other gates. Thus, the current dissipated in the two data input/output circuits communicating data with each other is constant irrespective of data.

The terminal DQ is directly connected to the data bus. No current paths should be created at other terminals DQ than the terminals DQ of two input/output circuits that are communicating current with each other. Since a DQ terminal and the data bus need to be connected through low impedance, no switching element should be inserted therebetween. Thus, the ENABLE signal is made to go low level for data input/output circuits that are not outputting data onto the data bus and are not receiving data over the data bus. This turns the transistor N1 off, so that the reference current I of the current source 81 ceases to flow through the transistor P2. As a result, the transistors P3 through P6 are also turned off, so that no current path is created at the DQ terminal.

In the input/output circuit of FIG. 35, there are provided three CMOS transfer gates 86, 87 and 88. The data Q is applied to the input of the transfer gate 86 through an inverter 89. The operation of the transfer gate 86 is controlled by a circuit consisting of an AND gate 90 having its inverting input connected to the data Oh and its non-inverting input connected to the data Ol and an inverter 91 that inverts the output of the AND gate 90. The supply voltage at high level is applied to the input of the transfer gate 87, the operation of which is controlled by a circuit consisting of an AND gate 92 having its non-inverting inputs connected to the data Oh and Ol and an inverter 93 that inverts the output of the AND gate 92. The ground voltage at low level is applied to the input of the transfer gate 88, the operation of which is controlled by a circuit consisting of an AND gate 94 having its inverting inputs connected to the data Oh and Ol and an inverter 95 that inverts the output of the AND gate 94. The output nodes of these transfer gates 86,87,88 are connected together to provide output data D.

That is, when Ol=H and Oh=L, the data D corresponds to the inverse of Q. When Ol=H and Oh=H, D=H, and, when Ol=L and Oh=L, D=L.

Instead of using the circuit CC1 enclosed by broken lines in FIG. 35, a circuit CC2 can be used which comprises two P-channel MOS transistors P8 and P9, two N-channel MOS transistors N13 and N14, and two inverters 96 and 97.

In the circuit CC2, the transistors P8, P9, N13 and N14 are connected in series between the supply voltage node and the ground potential node. The signal Oh is applied to the inverter 96 having its output connected to the gates of the transistors P8 and N13. The signal Ol is applied to the inverter 97 having its output connected to the gates of the transistors P9 and N14.

The circuit CC2 thus arranged can provide the same input data D as the circuit CC1.

The data input/output circuit of FIG. 36, as described previously, is adapted to the on-off control of the current source $\alpha I$ itself and differs from the circuit of FIG. 35 in that the circuit consisting of the transistors P4, N4, N5, P7, N10, N11, and N12 is replaced with a circuit consisting of a reference current source 98 providing a reference current I, four P-channel MOS transistors P10 through P13, and an N-channel MOS transistor N15.

The transistor P10 is connected between the supply voltage node and the terminal DQ. The transistors P11, P12 and P13 have their source-drain paths connected at their one ends to the supply voltage node and connected together at their other ends. The transistor N15 has its source-drain path connected between the transistors P11, P12 and P13 and the reference current source 98. The transistor P12 has its gate shorted to its drain. The transistor P10 has its gate connected to the connection point of the gate and drain of transistor P12. The transistors P10 and P12 form a current mirror circuit. The transistors P11 and N15 have their gates connected to receive the ENABLE signal and the transistor P13 has its gate connected to receive data Q.

With the input/output circuit thus arranged, when the ENABLE signal is high level, the transistor P11 turns off and the transistor N15 turns on, so that the reference current I flows through either transistor P12 or transistor P13. When Q=H, the transistor P13 turns off, so that the reference current I flows through the transistor P12. At this point, prior adjustment of the dimensions of the transistors P10 and P12 allows the current $\alpha I$ to flow through the transistor P10. This current $\alpha I$ is outputted onto the data bus through the terminal DQ.

In the circuit of FIG. 36 as well, as with the circuit of FIG. 35, the circuit CC3 enclosed by broken lines can be replaced with a circuit CC4 comprising two P-channel MOS transistors P8 and P9, two N-channel MOS transistors N13 and N14, and two inverters 96 and 97. The circuit CC4 provides the same input data D as the circuit CC3.

Figure 37:
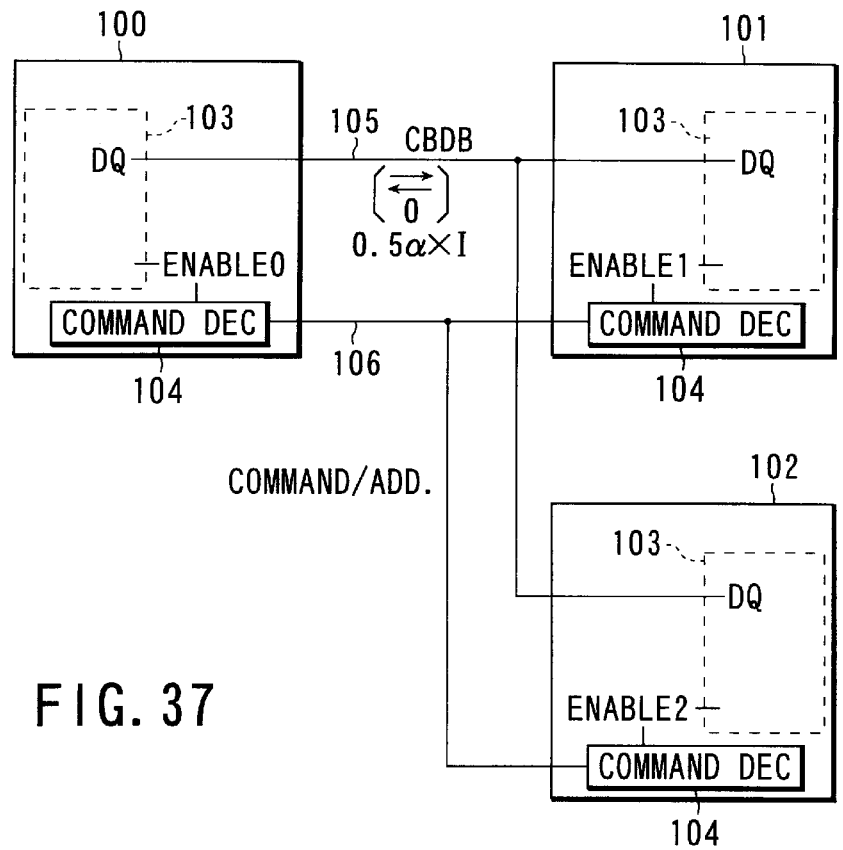
FIG. 37 shows an arrangement in which the data input/output circuit of FIG. 35 or 36 is incorporated into the data transfer system of FIG. 5A or 5B.

FIG. 37 shows an arrangement of the data transfer system composed of the controller 3 and the memory modules 2 into which the data input/output circuit arranged as shown in FIG. 35 or 36 is incorporated. Here, 100 denotes a controller corresponding to the controller 3 and 101 and 102 denotes memory modules corresponding to the memory modules 2. Reference numeral 103 denotes a data input/output circuit built into each of the controller 100 and the memory modules 101 and 102, 104 denotes a command decoder provided in each of the controller and the memory modules, 105 denotes a R/W concurrent bi-directional data bus (CBDB), and 106 denotes a command/address bus.

In the controller 100, the ENABLE signal (ENABLE0) is set low all the time. Thus, the data input/output circuit 103 in the controller 100 is enabled all the time, selecting one memory module through the command decoders 104 and the command address bus 106. Assume, for example, that the memory module 102 is selected. The enable signal ENABLE2 associated with the memory module 102 goes low, allowing the controller 100 and the selected memory module 102 to communicate data over the R/W concurrent bi-directional data bus 105 in the form of current. That is, data is transferred depending on in which direction current $0.5\alpha I$ flows or whether current flows or not.

Table 1 below shows a relationship among values and directions of currents flowing through the data bus 105 and data transferred over the data bus.

TABLE 1

| Own Q | Own source current | Partner's Q | Partner's source current | Total source current | Receiver current | Bus current | O1 | Oh | D |
|---|---|---|---|---|---|---|---|---|---|
| 0 | I | 0 | I | 2 × I | I | 0 | 0 | 0 | 0 |
|   |   | 1 | (1 + α)I | (2 + α)I | (1 + α/2)I | 0.5αIin | 1 | 0 | 1(=/Q) |
| 1 | (1 + α)I | 0 | I | (2 + α)I | (1 + α/2)I | 0.5αIout | 1 | 0 | 0(=/Q) |
|   |   | 1 | (1 + α)I | 2(1 + α)I | (1 + α)I | 0 | 1 | 1 | 1 |

In Table 1, own Q means data that is to be outputted from one of a memory module and the controller that are connected through the data bus and are going to communicate data with each other to the other. Own source current means a current that flows within the one of that memory module or the controller through the transistors N2 and N4 (see FIG. 35) connected to the terminal DQ or the transistors P3 and P10 connected to the terminal DQ (see FIG. 36). Partner's Q means data that is to be outputted from the other of that memory module and the controller. Partner's source current means current that flows within the other of that memory module and the controller through the transistors N2 and N4 connected to the terminal DQ or the transistors P3 and P10 connected to the terminal DQ. The total source current means the sum of the source currents in that memory module and the controller. The bus current means a current that flows through the data bus. The bus current 0.5αIin is a current in the direction from the bus to the memory module or the controller, and the bus current 0.5αIout is a current in the direction from the memory module or the controller to the data bus. The receiver current means the sum of or the difference between the own source current and the current flowing through the data bus.

From Table 1 it can be seen that partner's data Q is transferred as own data D.

Figure 38:
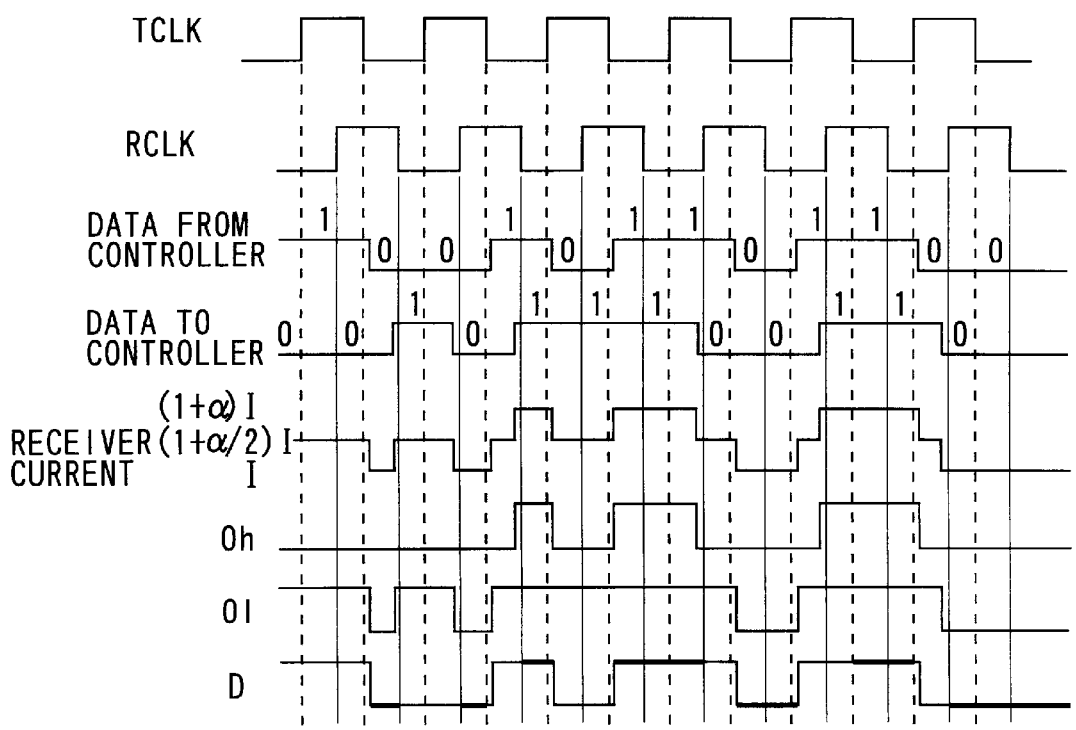
FIG. 38 is a timing chart illustrating a data transfer in a data input/output circuit using a bidirectional data bus.

Here, FIG. 38 shows a timing chart illustrating states of the data input/output circuits that are transferring data using the R/W concurrent bi-directional data bus when the controller 100 is placed in the neighborhood of the turnaround point as described previously, in which case, at the time of writing data into a memory module, data is transferred from the controller to the memory module in synchronism with the clock RCLK and, at the time of reading data from the memory module, data is transferred to the controller in synchronism with the clock TCLK.

It is seen that the logical values of data D produced according to Table 1 agree, in various cases, with the logical values of data the controller accepts or outputs. In FIG. 38, portions of data D indicated by bold lines indicate the states of data D determined by O1 and Oh independently of own output data. It is required to take in the data D in synchronism with the internal clocks Reu, Red, Rou, and Rod.

Finally, description is given of a specific arrangement of a buffer having a delay time D2 when the data input/output circuit of FIG. 35 or 36 is used.

Figure 39A:
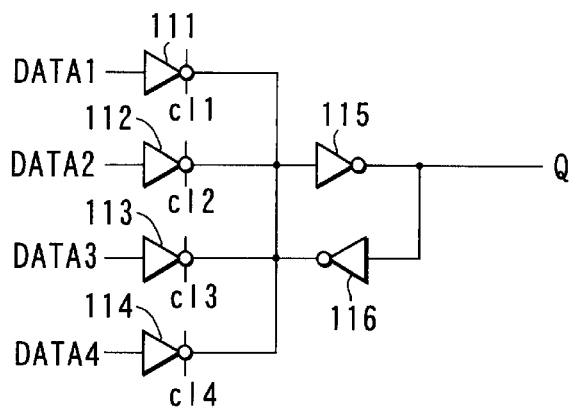
FIGS. 39A, 39B and 39C shows arrangements of the data selective output circuit for outputting data Q in sequence using the buffer drive signals produced in the circuits of FIGS. 30A to 30D and the buffer having a delay time D2 when the arrangement of FIG. 35 is used as the data input/output circuit.

FIG. 39A shows a data selective output circuit which outputs data Q in sequence as shown in the timing chart of FIG. 29 using the buffer drive signals c11 to c14 produced by the circuits shown in FIGS. 30A to 30D. This circuit comprises four clocked inverters 111 to 114 having their respective inputs supplied with data Data1 to Data4, their respective outputs connected together, and controlled by signals c11 to c14 (and their respective complement signals) and a latch circuit that consists of two inverters 115 and 116 in antiparallel connection and latches the outputs of the clocked inverters to provide the data Q.

Figure 39B:
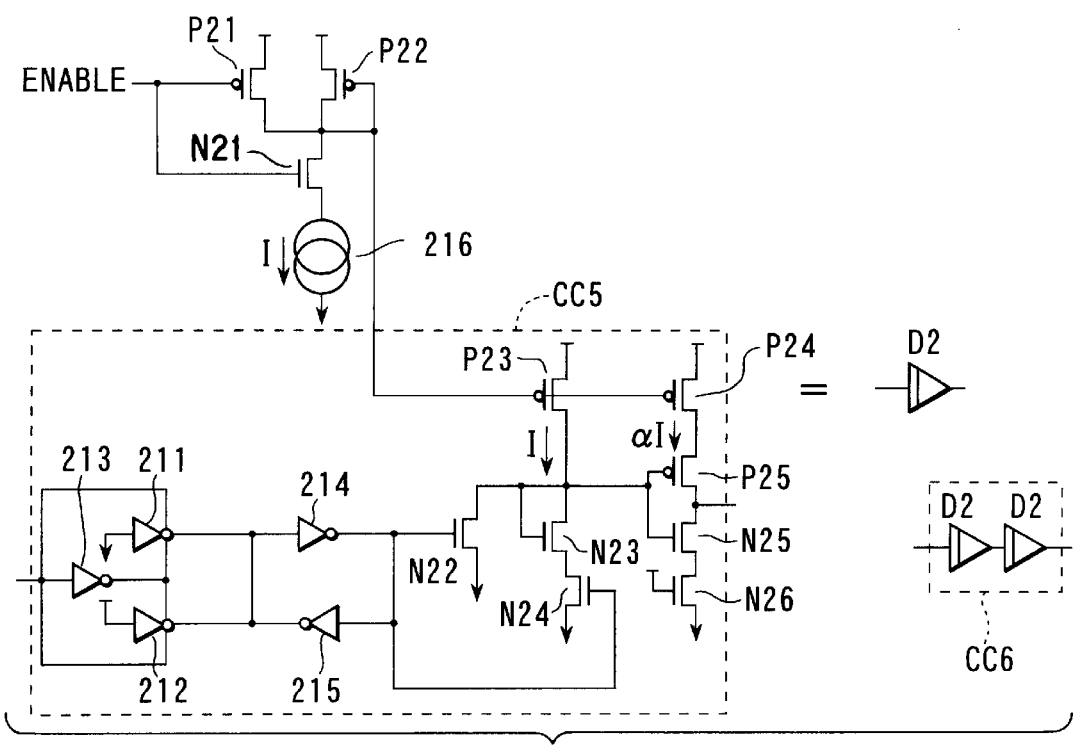

FIG. 39B shows a specific arrangement of a buffer having delay time D2 when the data input/output circuit of FIG. 35 is used. This circuit comprises a data selective output circuit section corresponding to the circuit of FIG. 39A and a delay circuit section providing a given time delay. The data selective output circuit section comprises two clocked inverters 211 and 212 having their inputs connected to the ground voltage node or the supply voltage node and corresponding to the clocked inverters 111 to 114 in the FIG. 39A circuit, an inverter 213 that inverts its input to apply control signals to the clocked gate of an N-channel MOS transistor in the clocked inverter 211 and the clocked gate of a P-channel MOS transistor in the clocked inverter 212, and inverters 214 and 215 corresponding to the inverters 115 and 116 forming the latch circuit.

The clocked gate of the P-channel transistor in the clocked inverter 211 and the clocked gate of the N-channel transistor in the clocked inverter 212 are supplied with the same signal as that applied to the inverter 213.

The delay circuit section is composed of a circuit consisting of P-channel MOS transistors P21 and P22 and an N-channel MOS transistor N21, and a reference current source 216, which correspond to the transistors P1, P2, and N1 and the reference current source 81 in FIG. 35, and P-channel transistors P23 to P25 and N-channel MOS transistors N22 to N26 which correspond to the circuit for converting data Q into current.

The circuit of FIG. 39B corresponds to one buffer. To construct a two-stage buffer circuit, it is required to connect two circuits CC5, which are shown enclosed by broken lines, in cascade as shown in a circuit CC6.

Figure 39C:
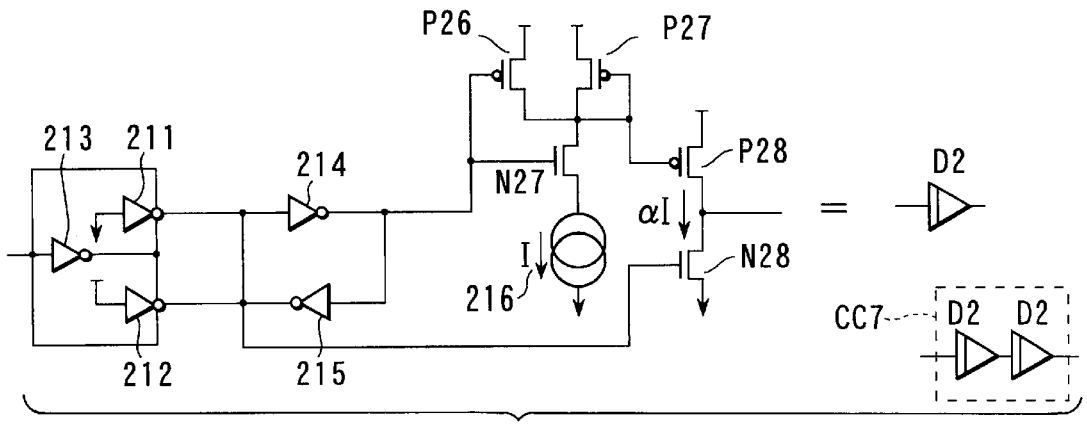

FIG. 39C shows a circuit arrangement of a buffer having a time delay D2 when the data input/output circuit of FIG. 36 is used. This circuit is composed of a data selective output circuit corresponding to the circuit of FIG. 39A and a delay circuit section having a given time delay. Like the circuit of FIG. 39B, the data selective output circuit section is constructed from two clocked inverters 211 and 212 and inverters 213, 214 and 215.

The delay circuit section is constructed from P-channel MOS transistors P26 to P28, N-channel transistors N27 and N28, and a reference current source 216 which corresponds to the data Q-to-current conversion circuit.

The circuit of FIG. 39C corresponds to one buffer. To construct a two-stage buffer circuit, it is required to connect two circuits in cascade as shown in a circuit CC7.

Since a data bus is used for bidirectional and concurrent data transfer, the number of data buses can be reduced as compared with the case where a read data bus and a write data bus are used. Further, since the number of pins of the memory modules and the controller can be reduced, the area used and the manufacturing cost can be reduced.

According to the present invention, as described above, data transfers can be made without any data collision on the data bus and any clock cycle gap. In addition, since the reading and the writing of data can be performed concurrently using the same terminal, a fast data transfer system can be implemented which requires fewer buses.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fast data transfer system comprising:

a plurality of memory modules;

a controller located adjacent to the memory modules in a direction where the memory modules are arranged and communicating data with each of the memory modules;

a clock generator for generating at least one clock;

at least one clock line having a go line portion and a return line portion, which extend in opposite direction along the arrangement of the memory modules and the controller, at least one clock generated by the clock generator being inputted to at least one clock line at an end of its go line portion and transferred over at least one clock line, and at least one clock transferred over the go and return line portions of at least one clock line being inputted to each of the memory modules and the controller, data input/output operations of each of the memory modules and the controller being performed in synchronism with at least one clock; and control circuits provided in each of the memory modules and the controller and including a timing signal generating circuit responsive to a go clock transferred over the go line portion of at least one clock line and a return clock transferred over the return line portion of at least one clock line for generating an intermediate timing signal having a timing which positioned in the middle of a phase displacement that occurs between the go clock and the return clock within two periods of at least one clock.

2. A fast data transfer system comprising:

a plurality of memory modules;

a controller located adjacent to the memory modules in a direction where the memory modules are arranged and communicating data with each of the memory modules;

a clock generator for generating a first basic clock and a second basic clock having a cycle period n (n is either 2 or 4) times longer than a cycle period of the first basic clock;

two clock lines each having a go line portion and a return line portion, which extend in opposite directions along the arrangement of the memory modules and the controller, the first and second basic clocks generated by the clock generator being respectively inputted to the two clock lines at ends of their respective go line portions and transferred over the two clock lines, and the first and second basic clocks transferred over the go and return line portions of the respective first and second clock lines being inputted to each of the memory modules and the controller, data input/output operations of each of the memory modules and the controller being performed in synchronism with the first and second basic clocks; and control circuits provided in each of the memory modules and the controller and including a timing signal generating circuit responsive to first and second basic go clocks transferred over the go line portions of the clock lines and first and second basic return clocks transferred over the return line portions of the clock lines for generating an intermediate timing signal having a timing which positioned in the middle of a phase displacement that occurs between the first basic go clock and the first basic return clock within a period n (n is either 2 or 4) times the cycle period of the first basic clock.

3. The system according to claim 2, further comprising a data bus provided along the arrangement of the memory modules and the controller for transferring data communicated between each of the memory modules and the controller and an address/command bus provided along the arrangement of the memory modules and the controller for transferring a command and an address issued from the controller to each of the memory modules.

4. The system according to claim 3, wherein the control circuit further includes a counter for counting either of the first basic go clock and the first basic return clock to set a cycle in which data is outputted.

5. The system according to claim 4, wherein the operation of the counter is controlled by a command transferred over the command/address bus.

6. The system according to claim 5, wherein the control circuit further includes an internal controller for receiving the intermediate timing signal generated by the timing signal generating circuit, the first basic go and return clocks, and a command transferred over the command/address bus, the internal controller, with the timing midway between the first basic go and return clocks in corresponding cycles taken as M, allowing the counter to count the number of cycles of the first basic clock to thereby set the cycle in which data is to be outputted in the following steps (1) to (4):

(1) enable the counter to count the cycles immediately after the timing M;

(2) count the cycles starting with the first basic go clock immediately after step (1);

(3) if a command taken in synchronously with the first basic return clock immediately after step (1) is a cycle count command, continue counting the cycles of the first basic go clock by as many cycles as needed; and (4) if the command taken in synchronously with the first basic return clock immediately after step (1) is not a cycle count command, reset the count in the counter and disable the counter from counting.

7. The system according to claim 5, wherein the control circuit further includes an internal controller for receiving the intermediate timing signal generated by the timing signal generating circuit, the first basic go and return clocks, and a command transferred over the command/address bus, the internal controller, with the timing midway between the first basic go and return clocks in corresponding cycles taken as M, allowing the counter to count the number of cycles of the first basic clock to thereby set the cycle in which data is to be outputted in the following steps (1) to (4):

(1) if a command taken in synchronously with the first basic go clock is a cycle count command, enable the counter to count the cycles at the timing M immediately after the receipt of the command; and (2) start counting the cycles starting with the first basic return clock immediately after the timing M and continue counting as many cycles as needed.

8. The system according to claim 5, wherein the control circuit further includes an internal controller for receiving the intermediate timing signal generated by the timing signal generating circuit, the first basic go and return clocks, and a command transferred over the command/address bus and a data output circuit controlled by the internal controller for outputting data, the internal controller, with the timing midway between the first basic go and return clocks in corresponding cycles taken as M, allowing the counter to count the number of cycles of the first basic clock to thereby set the cycle in which data is to be outputted and allowing the data output circuit to output data in the following steps (1) to (4):

(1) start counting the cycles starting with the first basic go clock cycle corresponding to second timing M immediately after first timing M;

(2) if a command, taken in synchronously with the first basis return clock in cycles from the first basic return clock cycle corresponding to and immediately following the first timing M to the cycle corresponding to the second timing M, is not a new cycle count command, including a state in which no command is present, stop the count operation and make ready for the next count operation;

(3) if there is a new cycle count command in commands taken in synchronously with the first basis return clock in cycles from the first basic return clock cycle corresponding to and immediately following the first timing M to the cycle corresponding to the second timing M, count a fixed number of cycles and output data from the data output circuit in synchronism with the first basic go clock starting with the cycle at which the fixed number is reached; and (4) if, with the first basic return clock cycle corresponding to and immediately following the first timing M taken as the first cycle in cycles from the first basic return clock cycle corresponding to and immediately following the first timing to the cycle corresponding to the second timing M, there is a new cycle count command in the i-th (i is a positive integer) cycle, count a fixed number of cycles incremented by (i−1) and output data from the data output circuit in synchronism with the first basic go clock starting with the cycle at which the fixed number is reached.

9. The system according to claim 5, wherein the control circuit further includes an internal controller for receiving the intermediate timing signal generated by the timing signal generating circuit, the first basic go and return clocks, and a command transferred over the command/address bus and a data output circuit for outputting data under control of the internal controller, the internal controller, with the timing midway between the first basic go and return clocks in corresponding cycles taken as M, allowing the counter to count the number of cycles of the first basic clock to thereby set the cycle in which data is to be outputted and allowing the data output circuit to output data in the following steps (1) to (5):

(1) start taking in a command starting with the first basic go clock cycle corresponding to first timing M;

(2) start counting the cycles starting with the first basic return clock cycle corresponding to and immediately following the first timing M;

(3) if a command, taken in synchronously with the first basic return clock in cycles through the first basic return clock cycle corresponding to second timing M, is not a new cycle count command, including a state in which no command is present, stop the count operation and make ready for the next count operation;

(4) if there is a new cycle count command in commands taken in synchronously with the first basis go clock in cycles from the first basic go clock cycle corresponding to the first timing M to the first basic go clock cycle corresponding to the second timing M, count a fixed number of cycles and output data from the data output circuit in synchronism with the first basic return clock starting with the cycle at which the fixed number is reached; and (5) if, with the first basic go clock cycle corresponding to the first timing M taken as the first cycle in cycles through the first basic go clock cycle corresponding to the second timing M, there is a new cycle count command in the i-th (i is a positive integer) cycle, count a fixed number of cycles incremented by (i−1) and output data from the data output circuit in synchronism with the first basic return clock starting with the cycle at which the fixed number is reached.

10. The system according to claim 3, wherein the memory modules and the controller each include a data input/output port, and each of the memory modules takes in the command in synchronism with either the first basic go clock or return clock, and when it is decided by the command that the memory module is selected, the data input/output port of the memory module is enabled for connection to the data bus.

11. The system according to claim 10, wherein the data bus is a bidirectional data bus that permits data to be transferred to the memory module and data transferred from the memory module to be transferred in two directions.

12. The system according to claim 11, wherein the bidirectional data bus makes data transfers by distributing currents between the controller or the memory modules and the memory modules or the controller, data items 0 and 1 to be outputted onto the bi-directional bus corresponding to a constant current I and a constant current $(1+\alpha)I$, respectively.

13. The system according to claim 12, further comprising a constant current switching circuit for switching between the constant currents I and $(1+\alpha)I$ in synchronism with either the first basic go clock or the first basic return clock.

14. The system according to claim 13, wherein the timing of outputting data from each of the memory modules is referenced to timing 180 degrees out of phase with one of positive- and negative-going edges of either the first basic go clock or the first basic return clock.

15. The system according to claim 14, wherein the timing of outputting data from each of the memory modules is generated by a synchronous adjustable delay circuit.

16. The system according to claim 15, wherein the synchronous adjustable delay circuit has a delay section having a circuit equivalent in arrangement to the constant current switching circuit.

17. The system according to claim 10, wherein each of the memory modules and the controller further includes a circuit which monitors a current flowing through the data input/output port and compares it with two reference currents, the current being made to correspond to one of data items 0 and 1 in input data when it is lower than the two reference currents, and the current being made to correspond to the other of data items 0 and 1 when it is higher than the two reference currents, and when the results of comparisons differ, data being outputted from the input/output port or the inverse thereof being taken as an input value.

18. The system according to claim 1, wherein the timing signal generating circuit includes:

a first internal clock generating circuit for generating a first control clock which is synchronized with the beginning of a first cycle of the first basic go clock transferred over the go line portion of one of the clock lines;

a second internal clock generating circuit for generating a second control clock which is synchronized with the beginning of the first cycle of the first basic return clock transferred over the return line portion of the one of the clock lines;

a third internal clock generating circuit for generating a third control clock which is synchronized with the beginning of a second cycle succeeding the first cycle of the first basic go clock transferred over the go line portion of the one of the clock lines;

a fourth internal clock generating circuit for generating a fourth control clock which is synchronized with the beginning of a second cycle succeeding the first cycle of the first basic return clock transferred over the return line portion of the one of the clock lines;

a first control signal generating circuit responsive to the first control clock and the second control clock for generating a first control signal corresponding to intermediate timing in the middle between the first and second control clocks;

a second control signal generating circuit responsive to the third control clock and the fourth control clock for generating a second control signal corresponding to intermediate timing in the middle between the third and fourth control clocks; and a third control signal generating circuit responsive to the first control signal, the second control signal, the third control clock, and the first control clock for generating a third control signal corresponding to intermediate timing in the middle between the first basic go and return clocks and a fourth control signal corresponding to intermediate timing in the middle between the second basic go and return clocks.

19. The system according to claim 18, wherein the timing signal generating circuit further includes: a fourth control signal generating circuit responsive to the first and second basic go clocks transferred over the go line portions of the clock lines for generating a fifth control signal for distinguishing between first and second successive cycles of the first basic go clock; and a fifth control signal generating circuit responsive to the first and second basic return clocks transferred over the return line portions of the clock lines for generating a sixth control signal for distinguishing between first and second successive cycles of the first basic return clock.

20. The system according to claim 18, wherein each of the first to fourth internal clock generating circuits has a synchronous adjustable delay circuit to generate a respective one of the first to fourth control clocks.

21. The system according to claim 20, wherein the synchronous adjustable delay circuit has a forward delay circuit arranged to delay an input signal and composed of a plurality of cascade-connected units each of which comprises an NAND gate and a NOR gate having its input connected to the output of the NAND gate; and a backward delay circuit composed of an equal number of cascade-connected units each of which comprises an NAND gate and a NOR gate having its input connected to the output of the NAND gate, the backward delay circuit receiving a signal delayed by the forward delay circuit and delaying the signal to thereby output a signal 360 degrees out of phase with the input signal to the forward delay circuit.

22. The system according to claim 18, wherein each of the first and second control signal generating circuits has a synchronous adjustable delay circuit to generate a respective one of the first and second control signals.

23. The system according to claim 22, wherein the synchronous adjustable delay circuit has a forward delay circuit arranged to delay an input signal and composed of a plurality of cascade-connected units each of which comprises an NAND gate and a NOR gate having its input connected to the output of the NAND gate; and a backward delay circuit composed of a plurality of cascade-connected units the number of which is reduced by half over the forward delay circuit and each of which comprises an NAND gate and a NOR gate having its input connected to the output of the NAND gate, the backward delay circuit receiving a signal delayed by the forward delay circuit and delaying the signal to thereby output a signal 180 degrees out of phase with the input signal to the forward delay circuit.

* * * * *

UNITED STATES PATENT AND TRADEMARK OFFICE
CERTIFICATE OF CORRECTION

PATENT NO. : 6,330,627 B1
DATED : December 11, 2001
INVENTOR(S) : Haruki Toda

It is certified that error appears in the above-identified patent and that said Letters Patent is hereby corrected as shown below:

<u>Column 30,</u>
Line 64, "Claim 1" has been replaced with -- Claim 2 --.

Signed and Sealed this

Thirtieth Day of July, 2002

*Attest:*

*Attesting Officer*

JAMES E. ROGAN
*Director of the United States Patent and Trademark Office*